(12) United States Patent  
Smith et al.

(10) Patent No.: US 10,377,448 B2  
(45) Date of Patent: Aug. 13, 2019

(54) SUBSEA CONNECTION ASSEMBLY PROVIDED WITH INDUCTIVE ELEMENTS FOR DATA TRANSMISSIONS

(71) Applicant: Flintstone Technology Limited, Dundee (GB)

(72) Inventors: David Smith, Dundee (GB); Andrew Clayson, Dundee (GB); Richard Taylor, Cumbria (GB)

(73) Assignee: Flintstone Technology Limited, Dundee (GB)

( * ) Notice: Subject to any disclaimer, the term of this patent is extended or adjusted under 35 U.S.C. 154(b) by 96 days.

(21) Appl. No.: 15/321,470

(22) PCT Filed: Jul. 1, 2015

(86) PCT No.: PCT/GB2015/051933  
§ 371 (c)(1),  
(2) Date: Jul. 4, 2017

(87) PCT Pub. No.: WO2016/001673  
PCT Pub. Date: Jan. 7, 2016

(65) Prior Publication Data  
US 2017/0225749 A1    Aug. 10, 2017

(30) Foreign Application Priority Data  
Jul. 1, 2014 (GB) .................. 1411716.2

(51) Int. Cl.  
*B63B 21/20* (2006.01)  
*B63B 21/50* (2006.01)  
(Continued)

(52) U.S. Cl.  
CPC .............. *B63B 21/50* (2013.01); *B63B 21/20* (2013.01); *B63B 21/508* (2013.01); *G01L 1/14* (2013.01);  
(Continued)

(58) Field of Classification Search  
CPC ....... G01L 1/14; E21B 17/028; E21B 47/122; E21B 17/023; H01F 38/14; H01F 38/18;  
(Continued)

(56) References Cited

U.S. PATENT DOCUMENTS

| | | | | |
|---|---|---|---|---|
| 7,190,280 B2* | 3/2007 | Hall | ...................... | E21B 17/003 175/40 |
| 7,573,502 B2* | 8/2009 | Sassa | ............... | G08B 13/19619 348/211.1 |

(Continued)

FOREIGN PATENT DOCUMENTS

| | | |
|---|---|---|
| GB | 2485832 A | 5/2012 |
| GB | 2504018 A | 1/2014 |

(Continued)

OTHER PUBLICATIONS

International Search Report and Written Opinion, PCT/GB2015/051933, dated Oct. 16, 2015, 13 pages.

(Continued)

*Primary Examiner* — Dean O Takaoka  
*Assistant Examiner* — Alan Wong  
(74) *Attorney, Agent, or Firm* — Myers Bigel, P.A.

(57) ABSTRACT

A connector or connector assembly (10, 210), such as a subsea or underwater connector or assembly including a first member (18, 218) movably connected or connectable to a second member (36, 236) and a first inductive element (24, 224a) provided on the first member (18, 218), the first inductive element (24, 224a) being arranged for inductive transmission and/or reception with a second inductive element (42, 242a) of the second member (36, 236). The first member (18, 218) may rotatably or pivotably connected or connectable to the second member (36, 236). The first inductive element (24, 224a) may be arranged on the first member (18, 218) to maintain inductive transmission with (Continued)

the second inductive element (42, 242a) of the second member (36, 236) throughout movement of the first member (18, 218) relative to a second member (36, 236).

24 Claims, 11 Drawing Sheets

(51) Int. Cl.
    *G01L 1/14*      (2006.01)
    *G01L 5/10*      (2006.01)
    *B63B 21/00*      (2006.01)

(52) U.S. Cl.
    CPC ........ *G01L 5/101* (2013.01); *B63B 2021/008* (2013.01); *B63B 2021/203* (2013.01); *B63B 2021/501* (2013.01)

(58) Field of Classification Search
    CPC ..... H01L 23/48; H01L 25/0652; B63B 21/04; B63B 21/18; B63B 21/20; B63B 21/50
    USPC ....................................................... 333/24 R
    See application file for complete search history.

(56) References Cited

U.S. PATENT DOCUMENTS

| | | | | |
|---|---|---|---|---|
| 7,926,436 | B2* | 4/2011 | Boatman | B63B 21/18 |
| | | | | 114/200 |
| 8,138,849 | B2* | 3/2012 | West | H04B 5/00 |
| | | | | 333/24 R |
| 2004/0035215 | A1* | 2/2004 | Hanna | E21B 19/09 |
| | | | | 73/794 |
| 2011/0316282 | A1 | 12/2011 | Holstein et al. | |
| 2012/0297890 | A1 | 11/2012 | Dang et al. | |

FOREIGN PATENT DOCUMENTS

| | | |
|---|---|---|
| WO | WO 2010/124165 A1 | 10/2010 |
| WO | WO 2012/113757 A | 8/2012 |
| WO | WO 2013/186553 A1 | 12/2013 |

OTHER PUBLICATIONS

Patents Act 1977: Search Report under Section 17(5), UKIPO Application No. GB1411716.2, Mar. 5, 2015, 4 pp.

\* cited by examiner

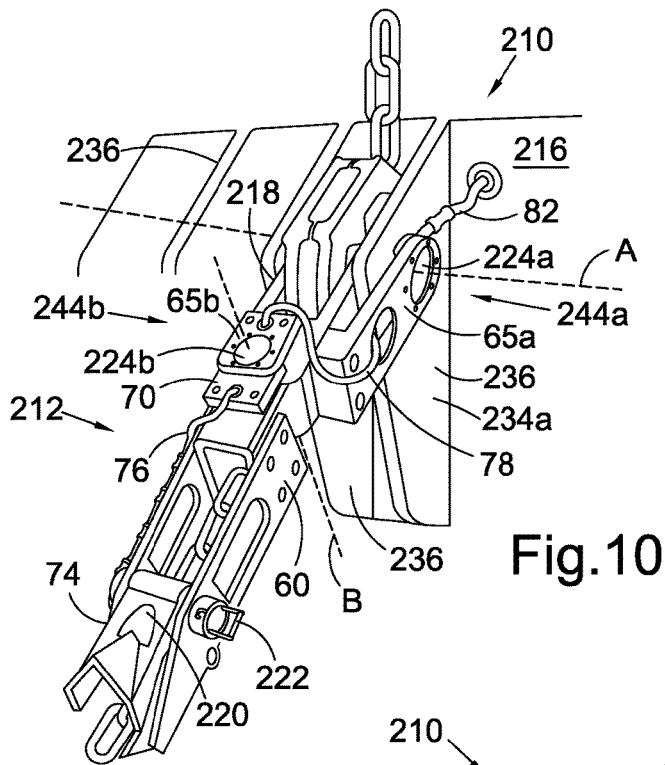
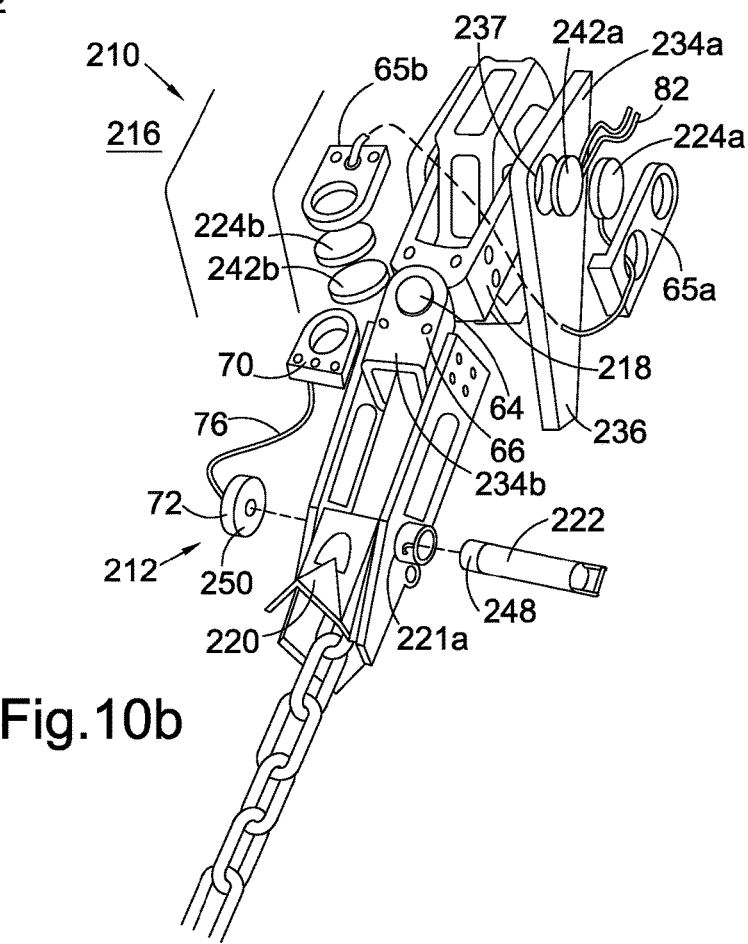
Fig.10a
Fig.10b

SUBSEA CONNECTION ASSEMBLY PROVIDED WITH INDUCTIVE ELEMENTS FOR DATA TRANSMISSIONS

RELATED APPLICATIONS

This application is a 35 U.S.C. § 371 national stage application of PCT Application No. PCT/GB2015/051933, filed on Jul. 1, 2015, which claims priority from Great Britain Patent Application No. 1411716.2 filed on Jul. 1, 2014, the contents of which are incorporated herein by reference in their entireties. The above-referenced PCT International Application was published in the English language as International Publication No. WO 2016/001673 A1 on Jan. 7, 2016.

FIELD OF INVENTION

This invention relates to a connector, such as a subsea or underwater connector, a connector or connection assembly, a system for inductive transmission, e.g. between a connector, such as a subsea or underwater connector and a structure, and associated methods. The connector may find utility in or on a structure, such as a marine structure, offshore structure, subsea structure, floating structure, floating platform, buoy or vessel.

BACKGROUND OF INVENTION

Connectors, such as subsea or underwater connectors, can include one or more sensors to determine, for example, a load, strain and/or tension acting on the connector in use, i.e. when the connector connects a chain or line to a marine structure, such as a buoy, vessel or the like. These sensors may require power supply or data communication for operation and/or transmission of determined strain or load data.

Hardwiring or fixed wires or electrical connections may be used to connect the sensors to a power supply. The electrical connections may be subject to the conditions of a marine and offshore environment, which may have an impact on the lifetime of any such electrical connection and/or wire.

The movement of the connector relative to the buoy or vessel or the movement of parts of the connector relative to each other can cause strain on the electrical connection and may shorten the lifetime of the electrical connection and/or wiring. Such strain may cause cracks or micro cracks in the insulation of the electrical connections and moisture may enter into such connections, causing erosion or damage of the electrical connection or wiring, thereby limiting the lifetime of such electrical connections.

A subsea or underwater connector system can last over thirty years, which can be longer than the lifetime of batteries or the like. As the subsea connectors or underwater connectors may be installed in remote subsea locations, the exchange of batteries or electrical connections may be difficult and costly.

Service or repair of components in a subsea environment can be challenging as it is often performed by divers or remotely operated vehicles. Visibility may be impeded, marine growth may obstruct or obscure markings and the available time may be short due to changing conditions, air supply and/or cost implications.

SUMMARY OF INVENTION

According to a first aspect there is provided a connector, such as a subsea or underwater connector, comprising a first member movably, e.g. rotatably or pivotably, connected or connectable to a second member;

a first inductive element provided on the first member, the first inductive element being arranged for inductive transmission and/or reception with a second inductive element of the second member.

The first inductive element may be arranged on the first member to maintain inductive transmission with the second inductive element of the second member throughout movement, e.g. rotation or rotational movement, of the first member relative to a second member, or vice versa, e.g. in use.

By providing inductive, e.g. wireless, transmission between the first member and/or the second member, the need of wiring, such as hard wiring, between the first member and/or the second member may be eliminated.

In some examples, the connector may comprise a first axis. The first axis may be comprised in or part of the first member. The first axis may define a first axis of rotation of the first member and/or connector, e.g. relative to the second member, e.g. in use. The first axis may extend in a transverse direction of the first member and/or connector. The first axis may be perpendicular or orthogonal, e.g. substantially perpendicular or orthogonal, to a longitudinal axis of the first member and/or connector. The first member and/or connector may be connectable or connected, e.g. rotatably or pivotably connectable or connected, to the second member to permit movement, e.g. rotational movement, of the first member relative to the second member, or vice versa, e.g. about or around the first axis, e.g. in use. The first inductive element may be arranged on the first member to maintain inductive transmission with the second inductive element of the second member throughout movement, e.g. rotation or rotational movement, of the first member relative to a second member around or about the first axis of the connector and/or first member e.g. in use.

The first and/or second inductive element may be arranged/arrangeable on or provided/providable relative to the first axis. The first and/or second inductive element may be arranged/arrangeable on or provided/providable relative to the first axis to maintain inductive transmission between the first and second elements throughout rotation, e.g. of the first member relative to the second member.

In some examples, the first and/or second inductive element may be arranged/arrangeable so as to extend in a direction perpendicular or orthogonal, e.g. substantially perpendicular or orthogonal, to the first axis and/or to intersect the first axis. The first and/or second inductive element may be arranged/arrangeable to extend in a direction along or parallel, e.g. substantially parallel, to a/the longitudinal axis of the first member and/or the connector, e.g. in use. The first and/or second inductive elements may be arranged/arrangeable on or provided/providable relative to the first axis to permit and/or provide transmission and/or reception of the one or more signal(s) in a direction parallel, e.g. substantially parallel, to or along the first axis and/or in a direction perpendicular, e.g. substantially perpendicular, to a longitudinal or central axis of the first member and/or connector.

In some examples, the first and/or second inductive elements may be arranged/arrangeable, e.g. arranged/arrangeable relative to each other, to permit transmission and/or reception of one or more signal(s). The one or more signal(s) may comprise at least one or more of power, energy, e.g. electric energy, and/or data.

The one or more signal(s) may comprise one or more power or energy signal(s). Alternatively or additionally, the one or more signal(s) may comprise at least one or more data signal(s).

The first and/or second inductive element may be configured for inductive transmission and/or reception of energy, e.g. electric energy, or power. Energy or power may be transmitted to and/or received by the first and/or second inductive elements via the one or more power signal(s).

Alternatively or additionally, the first and/or second inductive element may be configured for inductive transmission and/or reception of data. Data may be transmitted to and/or received by the first and/or second inductive elements via the one or more data signal(s).

By providing inductive transmission between the first and second members, electrical connections or wiring between first and second member may be eliminated.

For example, in use, the first and second inductive elements may be arranged to oppose, be opposite, adjacent, and/or proximate each other for inductive transmission. The first inductive element may be arranged/arrangeable relative to the second inductive element to oppose, be opposite, adjacent, and/or proximate to the second inductive element, e.g. in use.

In some examples, the first and second inductive elements may define a pair of inductive elements, e.g. a first pair of inductive elements. The first pair of inductive elements may be associated with the first axis. For example, transmission and/or reception of the one or more signal(s) between the first pair of induction elements may take place in a direction parallel to or along the first axis and/or a direction perpendicular, e.g. substantially perpendicular to a/the longitudinal or central axis of the first member and/or connector.

In some examples, the connector may comprise a first connection arrangement. The first connection arrangement may be part of or comprised in the first member. The first inductive element may be arranged or provided on the first connection arrangement.

The first inductive element may be arranged or provided on the first connection arrangement so as to be in communication or communicable with the second inductive element, e.g. in use.

The connector may comprise a first bearing means or arrangement. The first bearing means or arrangement may be part of or comprised in the first connection arrangement. The first bearing means or arrangement may be part of or comprised in the first member. The first bearing means or arrangement may be configured/adapted to provide rotational movement, e.g. low friction rotational movement, of the first member relative to the second member.

In some examples, the connector may comprise an elongate member. The elongate member may be part of or comprised in the first connection arrangement. The elongate member may be provided or arranged for rotatably or pivotably connecting the first member to the second member.

The elongate member or protrusion may be provided in, define or comprise the first axis. The elongate member or protrusion may be arranged coaxially with the first axis. For example, a central axis or longitudinal axis of the elongate member or protrusion may be coaxial with the first axis.

The first inductive element may be provided or arranged on the elongate member, e.g. on an end or end portion of the elongate member or protrusion. The elongate member may be or comprise a first pin and/or bolt.

In some examples, the elongate member may comprise a first protrusion and a second protrusion. At least one first inductive element may be provided or arranged on the first and/or second protrusion, e.g. on an end or end region of the first and/or second protrusion. The first and second protrusions may be arranged coaxially to one another. The first and second protrusions may be provided on one or more outer surface(s) of the first member. The first and second protrusions may be provided on opposite or opposing surfaces of the first member. The first and second protrusions may be arranged coaxially with the first axis. For example, a central axis or longitudinal axis of the first and second protrusions may be coaxial with the first axis.

Alternatively or additionally, the first connection arrangement may be or comprise a housing, casing or enclosure. The housing, casing or enclosure may be part of or comprised in the first member. The housing may comprise or house the first inductive element. The housing may locate and/or position the first inductive element relative to the second inductive element. The housing may be connected or connectable to the first member, e.g. to locate and/or position the first inductive element relative to the second inductive element.

In some examples, there may be provided a plurality of second members. The second member may be part of or comprised in the plurality of second members. Each second member of the plurality of second members may comprise or be provided with a respective second inductive element.

In some examples, the connector may comprise a plurality of first inductive elements. The plurality of first inductive element may be part of or comprised in the first member. Each first inductive element may be in communication with and/or associated with a respective second inductive element. Each first and second element may define a pair of inductive elements.

In some examples, the second member or at least one second member of the plurality of second members may be provided external or remotely of the connector. The at least one second member may be configured to connect the connector, e.g. the first member, to a structure.

The at least one second member may comprise or define at least one second connection arrangement. The at least one connection arrangement may be configured to connect the first member and/or connector to the structure. The second inductive element may be arranged or provided on or by the at least one second connection arrangement. The at least one second connection arrangement may arrange the second inductive element relative to the first inductive element to permit transmission between the first and second inductive elements. Transmission between the first inductive elements and the second inductive element may define or comprise an external connector transmission path.

In some examples, the at least one second connection arrangement may be or comprise a plurality of support members, such as a bracket, plate, e.g. support plate or cheek plate, holder or the like. The support member may be configured to locate and/or position the second inductive element, e.g. on the structure, relative to the first inductive element. Each support member may comprise an aperture. The connector and/or first member may be connectable or connected, e.g. rotatably or pivotably connectable or connected, to at least one support member or a pair of support members.

In some examples, the connector may comprise a first aperture and/or a second aperture. The first and/or second apertures may be part of or comprised in the first member and/or at least one of the one or more first connection arrangement(s).

The elongate member may be inserted or insertable into and/or through the first and second apertures of the first member and/or the aperture of each support member of the pair of support members for connecting the connector and/or first member to the support member, e.g. the pair of support members and/or a structure.

In some examples, the connector may comprise at least one other second member of the plurality of second members.

The connector may comprise at least one other second connection arrangement. The at least one other second connection arrangement may be part or or comprised in the at least one other second member.

The at least one other second connection arrangement may be or comprise an attachment member, such as a further bracket, plate, holder or the like. The attachment member may be configured to connect, e.g. rotatably or pivotably connect, the first member to the at least one other second member.

In some examples, the first member may comprise one or more first connection arrangement(s).

The connector may comprise a further first, a further second aperture, a further third aperture and/or a further fourth aperture. The further first and/or second aperture may be part of or comprised in the first member and/or the attachment member. The further third and/or further fourth aperture may be part of or comprised in the at least one other second member and/or attachment member. In some examples, the further first and/or further second apertures of the first member may be provided instead of or in addition to the first and/or second apertures.

The connector may comprise a further elongate member. The first member may be connected or connectable to the at least one other second member by the further elongate member, e.g. a second pin or bolt. The further elongate member may connect, secure or fasten the first member to the at least one other second member, e.g. in use. For example, the further elongate member may be received, inserted, receivable and/or insertable into the further first and/or second aperture of the first member and/or the further third and/or fourth apertures at least one other second member, e.g. in use.

In some examples, the attachment member may be configured to locate and/or position at least one second inductive element relative to a/the respective first inductive element.

In some examples, the at least one other second member may define or comprise a second axis. The second axis may define a second axis of rotation of the at least on other second member relative to the first member. The second axis may extend in a transverse direction of the at least on other second member and/or connector. The second axis may be substantially perpendicular or orthogonal to a longitudinal axis of the at least on other second member and/or connector. The further elongate member may define or comprise the second axis. For examples, the second axis may be coaxial with a central or longitudinal axis of the further elongate member.

The plurality of first inductive element may be part of, provided on, or comprised in the first member. Transmission between at least one first inductive element, e.g. arranged/provided on the first member, and the second inductive element provided on the at least one other second member may define or comprise an internal connector transmission path.

Each of the plurality of first inductive elements may define either an internal or external connector transmission path with the respective second inductive element located on at least one of the plurality of second members. For example, a/the first inductive element associated with the second inductive element of the at least one second member may define the external connector transmission path. The first inductive element associated with the second inductive element of the at least one other second member may define the internal connector transmission path.

At least one first inductive element of the plurality of first inductive elements and/or the second inductive element of the at least one other second member may be arranged on or provided relative to the second axis. The at least one first inductive element and/or the second inductive element of the at least one other second member may be arranged relative to the second axis to maintain inductive transmission between the first and second elements throughout rotation, e.g. rotational movement of the at least one other second member relative to the first member, e.g. about or around the second axis. The at least one first inductive element and the second inductive element of the at least one other second member may define a pair of inductive elements, e.g. a second pair of inductive elements. The second pair of inductive elements may be associated with the second axis. For example, the first and second inductive elements may be arranged on or provided relative to the second axis to permit and/or provide transmission and/or reception of the one or more signal(s) in a direction parallel to or along the second axis and/or perpendicular, e.g. substantially perpendicular, to a/the longitudinal or central axis of the at least one other second member and/or connector. For example, the first and/or second inductive elements may be arranged/provided on the further elongate member, e.g. on an end portion of the further elongate member.

In some examples, the first and/or second inductive element may be arranged so as to extend in a direction perpendicular or orthogonal to the second axis and/or to intersect the second axis. The first and/or second inductive elements may be arranged to extend in a direction along or parallel to a longitudinal axis of the at least one other second member and/or connector, e.g. in use.

In some examples, the first axis of the first member may be substantially perpendicular to the second axis of the at least one other second member, e.g. in use.

In some examples, the connector may comprise a plurality of axes, such as axes of rotation. At least one first inductive element and/or second inductive element may be provided on or relative to each axis of the plurality of axes. At least one/each first inductive element may be associated with a respective second inductive element to define a pair of inductive elements. Each pair of inductive elements may be associated with at least one axis of the plurality of axes. For example, transmission and/or reception of the one or more signal(s) between the first and second inductive elements of the pair of inductive elements may take place in a direction along or parallel, e.g. substantially parallel, to the at least one axis of the plurality of axes and/or perpendicular, e.g. substantially perpendicular, to a/the longitudinal or central axis of the first member and/or connector.

The at least one other second connection arrangement may comprise a further housing, casing or enclosure. The further housing may be connected or connectable to the at least one other second member. The further housing may comprise or house the second inductive element of the at least one other second member. The further housing may locate and/or position the second inductive element of the at least one other second member relative to at least one first inductive element, e.g. provided/arranged on the first member. The further housing may be connected or connectable to the at least one other second member so as to locate and/or position the second inductive element of the at least one other second member relative to at least one first inductive element.

The connector may comprise a further portion. The further portion may be connected or connectable, e.g. pivotably or rotatably connected or connectable, to the first and/or at least one other second member. The further portion may be configured for connection to the first and/or at least one other second member. The connector may comprise a yet further elongate member, such as a pin or bolt, e.g. load or shear pin or bolt. For example, in use, the yet further elongate member may be utilised for connecting the further portion to the first and/or at least one other second members.

The further portion and/or the first member and/or the at least one other second member may be configured for receiving the yet further elongate member. For example, the further portion and/or the first member and/or the at least one other second member may each comprise a respective yet further first and/or second aperture.

In some examples, the yet further first and/or second aperture may be configured for receiving the yet further elongate member, e.g. for connecting the further portion to the first member and/or the at least one other second member.

The further portion may be a portion of the connector. The further portion may be connected or connectable to a chain or line or the like.

In some examples, the further portion may be or comprise means for engaging with a chain or line. The further portion may be configured to inhibit or permit movement of a chain or line relative to the further portion.

In some examples, connector may comprise a third axis. The third axis may define a third axis of rotation of the further portion relative to the first member and/or the at least one other second member. The third axis may extend in a transverse direction of the first member, at least on other second member and/or connector. The third axis may be substantially perpendicular or orthogonal to a longitudinal axis of the first member, at least on other second member and/or connector. The yet further elongate member may define or comprise the third axis. For examples, the third axis may be coaxial with a central or longitudinal axis of the yet further elongate member. The connector may comprise a third pair of inductive elements, e.g. first and second inductive elements. The third pair of inductive elements may be associated with the third axis.

The connector may comprise one or more sensor(s) or sensing element(s). At least one sensor or sensing element of the one or more sensor(s) or sensing element(s) may comprise a strain, load or tension sensor, sensing element or gauge. The at least one sensor or sensing element may be configured for monitoring, sensing and/or measuring strain, load and/or tension acting on the connector, e.g. in use.

In some examples, the at least one sensor or sensing element may comprise a vibrating wire or resonant sensor or sensing element.

The at least one or at least one other sensor or sensing element of the one or more sensor(s) or sensing element(s) may be arranged/configured to monitor and/or measure an inclination and/or rotational movement of the first member with respect to the at least one second member and/or a structure. For example, the at least one or at least one other sensor or sensing element may be utilised to indicate and/or determine an attitude or pitch, e.g. attitude or pitch angle, of the first member relative to the at least one second member and/or a structure. In some examples, the/at least one other sensor or sensing element may comprise a gyroscope, e.g. a MEMS (microelectromechanical systems) gyroscope.

In some examples, the/at least one other sensor or sensing element may comprise a position sensor or sensing element, e.g. a linear position sensor or linear inductive position sensor, proximity sensor, e.g. an ultrasonic or inductive proximity sensor, accelerometer or the like.

In some examples, the/at least one other sensor or sensing element may be configured to measure and/or determine one or more properties, e.g. salinity, acidity and/or alkalinity, of a connector environment, such as a subsea or underwater environment. The/at least one other sensor or sensing element may comprise an arrangement or means for optical observation, such as a camera or the like, and/or an arrangement or means for acoustical observation, such as a loudspeaker or the like, of a connector environment.

In some examples, the connector may comprise a yet further housing, enclosure or casing. The yet further housing may be part of or comprised in the first member. The yet further housing may be provided on the first member, e.g. on an outer surface of the first member. The yet further housing may comprise or house the at least other sensor or sensing element.

In some examples, the elongate member or protrusion, the further elongate member and/or the yet further elongate member may comprise, support or house the at least one sensor or sensing element.

In some examples, the first inductive element may be provided on the elongate member or protrusion, the further elongate member and/or the yet further elongate member and/or coupled or linked to the at least one sensor or sensing element by a coupling means or arrangement, such as wiring, electric connection, electric cables, electric circuits or the like.

Inductive transmission between the first inductive element and the respective second inductive element may transmit the one or more signal(s) to the at least one sensor via the first inductive element, e.g. in use In some examples, the at least one sensor or sensing element may be part of or comprised in or on the elongate member or protrusion, the further elongate member and/or the yet further elongate member. The at least one sensor may be adapted/configured for monitoring, measuring and/or determining strain, load and/or tension, which may act on the connector and/or the elongate member or protrusion, the further elongate member and/or the yet further elongate member, e.g. in use.

The connector may comprise a third inductive element. The third inductive element may be provided/arranged on or be part of the elongate member or protrusion, the further elongate member and/or the yet further elongate member. The third inductive element may be arranged on the elongate member or protrusion, the further elongate member and/or the yet further elongate member, e.g. on a free end of the elongate member or protrusion, the further elongate member and/or the yet further elongate member. The third inductive element may be arranged or provided on the elongate member or protrusion, the further elongate member and/or the yet further elongate member to extend in a direction perpendicular, e.g. substantially perpendicular, to a longitudinal axis of the elongate member or protrusion, the further elongate member and/or the yet further elongate member.

In this example, the third inductive element may be coupled or linked to the at least one sensor by the/at least one other coupling means or arrangement, e.g. wiring, electric connection, electric cables, electric circuits or the like.

The connector may comprise a fourth inductive element. The fourth inductive element may be part of or comprised in or on the first member, at least one other second member and/or further portion. The fourth inductive element may be provided or arranged on the first member, at least one other second member and/or further portion to be communicable with the third inductive element, which may be provided on the elongate member, the further elongate member and/or the yet further elongate member, e.g. in use.

The fourth inductive element may be provided on or in the yet further housing, casing or enclosure. The yet further housing may be attached to the first member, at least one other second member and/or further portion so that the fourth inductive element is communicable with the third inductive element, e.g. in use. For example, the yet further housing may be provided on an outer surface of the first member, at least one other second member and/or further portion. The fourth inductive element and/or the yet further housing may be arranged on the first member, the at least one other second member and/or the further portion to occlude at least one of the apertures of the first member, the at least one other second member and/or the further portion.

In some examples, the third and fourth inductive elements may define the third pair of inductive elements, which may be associated with the third axis of the connector.

The third and/or fourth inductive element may be configured for inductive transmission and/or reception of the one or more signal(s). The third and/or fourth inductive element may be configured for inductive transmission and/or reception of energy or power.

Alternatively or additionally, the third and/or fourth inductive elements may be configured for inductive transmission and/or reception of data.

For example, when the elongate member, the further elongate member and/or the yet further elongate member is/are received in the respective first and/or second apertures, the respective further first, second, third, and/or fourth apertures and/or respective yet further first and second apertures, the third and fourth inductive elements may be in communication with one another, e.g. in use. The third and fourth inductive element may be arranged so as to oppose and/or face each other, when the elongate member, further elongate member and/or the yet further elongate member is inserted into the first member and the at least one second member, the first member and at least one other second member and/or the first member, at least one other second member and/or further portion, respectively, e.g. in use. When the elongate member, the further elongate member and/or the yet further elongate member is received in the respective first member and/or the at least one second member, the respective first and/or at least one other second member and/or the respective first member, at least one other second portion and/or further portion, the one or more signal(s) may be transferred and/or received between the third and fourth inductive elements. For example, in use, the one or more power signal(s) may be transmitted from or between the fourth inductive element to the third inductive element on the elongate member, further elongate member and/or the yet further elongate member to provide power or energy to the at least one sensor or sensing element. The third and fourth elements may define an internal connector transmission path, e.g. in use.

Alternatively or additionally, the one or more data signal(s) received by the fourth inductive element from the third inductive element on the elongate member, further elongate member and/or the yet further elongate member may be utilised to receive or read-out data from the at least one sensor or sensing element. The one or more power signal(s) may operate the at least one sensor to transmit or transfer one or more data signal(s) to or via/between the third and/or fourth inductive element.

By providing inductive transmission of the one or more signal(s), removal of the elongate member, further elongate member and/or the yet further elongate member from the connector may be facilitated. Inductive transmission of the one or more signal(s) between the third and fourth inductive element may eliminate wiring of the sensor to provide power to the at least one sensor and/or the use of a battery or the like to enable data read-out.

In some example, the third inductive element may be provided in addition or instead of a first inductive element.

The fourth inductive element may be in communication with the first and/or second inductive element. The one or more signal(s) may be transferred between the first and fourth inductive elements and/or the second and fourth inductive elements. In some examples, transmission of the one or more signal(s) between the first and fourth inductive elements and/or the second and fourth inductive elements may be inductive or wireless. In other examples, the first and fourth inductive elements and/or the second and fourth inductive elements may be coupled or linked to each other by the coupling means or arrangement and/or a further coupling means or arrangement, such as wiring, one or more electric connections, one or more electric cables or electric circuits or the like, for transmission of the one or more signal(s) between the first and fourth inductive elements and/or the second and fourth inductive elements. The coupling means or arrangement and/or further coupling means or arrangement may be provided in the interior of the first and/or second member. For example, the first and/or at least one other second member may comprise a recess or channel adapted for receiving and/or enclosing the further coupling means or arrangement. By providing the coupling means or arrangement and/or further coupling means or arrangement internally of the first member, damage of the wiring may be minimised or prevented.

In other examples, the further coupling means may be provided external of the first and/or at least one other second member. The further coupling means may be provided on non-moving or static portions of the first and/or second member.

In some examples, the connector may be or comprise a chain stopper.

In some examples, the connector may comprise an underwater or subsea connector, e.g. a BTC connector, or an underwater or subsea mooring connector (SMC connector). For examples, the connector may be utilised to moor, tether, and/or anchor a structure to a seabed.

In some examples, the connector may be utilised to connect a chain, line, wire, rope or the like to a structure, such as a buoy, e.g. a submerged turret loading or a submerged turret production buoy. In other examples, the structure may comprise an offshore structure, floating platform, vessel or the like.

In some examples, the at least one second member may be part of or comprised in a structure, such as a buoy, vessel, offshore structure, marine structure, floating platform or the like.

According to a second aspect there is provided a connector or connection assembly, the connector or connection assembly comprising;
    a connector;
    a structure;

wherein the connector is movably, e.g. rotatably or pivotably, connected or connectable to the structure, the connector comprising a first inductive element, the first inductive element being arranged for inductive transmission with a second inductive element of the structure.

The connector may be or comprise a connector according to the first aspect of the present invention.

The connector assembly may comprise a first member. The first member may be part of or comprised in the connector.

The at least one second member may be part of or comprised in the structure. The at least one second member may comprise at least one second connection arrangement. The at least one second connection arrangement may comprise the second inductive element.

The first member of the connector may be movably, e.g. rotatably or pivotably, connected or connectable to the structure.

The first inductive element may be arranged on the first member to maintain inductive transmission with/between the second inductive element of the structure throughout movement, e.g. rotation, of the first member and/or connector relative to the structure, e.g. in use.

By providing inductive transmission between the first member and/or connector and the structure, the need for wiring, such as hard wiring, between the first member and/or connector and the structure may be eliminated.

The at least one second connection arrangement may be provided on the structure. For example, the structure may comprise a plurality of support members. The plurality of support members may be part of or comprised in the at least one second connection arrangement. The support members may extend or protrude from the structure. At least one pair of the support members may be utilised to connect the first member and/or connector to the structure. The support members may be arranged to be opposite or opposed each other. The structure may be retrofitted with the support members.

Each support member may comprise a retaining member, such as a bracket or plate, such as a cheek plate. The retaining member may comprise a recess or slot for receiving the first connection arrangement.

The first member may comprise a first connection arrangement. The first connection arrangement may be configured for connecting the connector and/or first member to the structure. The first connection arrangement may comprise an elongate member, such as a first pin or bolt, or a protrusion.

The elongate member or protrusion may engage with slot or recess to connect, secure or attach, e.g. pivotably or rotatably connect, secure or attach, the first member and/or connector to the structure. The slot or recess is configured for allowing rotational movement of the first member and/or connector relative to the structure.

In other examples, the/each support member comprises an aperture for receiving the first connection arrangement, e.g. elongate member or protrusions, and/or connecting the first member and/or connector to the structure. The aperture may allow rotational movement of the connector and/or first member relative to the structure.

The second inductive element may be provided on each/the support member.

For example, in use, when the connector is connected to the structure, the/at least one of the first and/or second connection arrangements may define or comprise a joint, connection or linkage, such as a subsea or underwater joint, connection or linkage. Inductive transmission may take place or occur over the joint, connection or linkage of the portion and/or connector to the structure, e.g. in use. The joint, connection or linkage may allow rotational movement of the connector relative to the structure. The one or more signal(s) may be transmitted and/or received across the first joint via/between the first and second inductive elements. By providing inductive transmission and/or reception of the one or more signal(s) across the first joint, wiring, such as hard wiring may be eliminated while the first joint may provide a rotatable connection between the first portion and the structure.

For example, in use, when the first portion and/or connector is connected to the structure, the first and second inductive element may be in communication with one another.

The first and/or second inductive element may be arranged relative to the first axis to maintain inductive transmission throughout rotational movement of the first portion and/or connector. In use, the first and/or second inductive element may be arranged relative to the first axis so as to be perpendicular or orthogonal, e.g. substantially perpendicular or orthogonal, to the first axis and/or intersect the first axis. The first and second inductive elements may be arranged so as to oppose, be opposite, adjacent and/or proximate each other, when the first portion and/or connector is connected to structure. By arranging the first and second inductive elements to oppose each other, inductive transmission and/or reception of the one or more signal(s) may be facilitated The connector assembly may comprise a control arrangement. The control arrangement may be in communication with the one or more sensor(s) or sensing element(s). For example, the control arrangement may provide the one or more signal(s) to the/each sensor(s) or sensing element(s), e.g. via the first, second, third and/or fourth inductive element. The control arrangement may be configured to receive the one or more signal(s) from the/each sensor(s), e.g. via the first, second, third and/or fourth inductive element.

The control arrangement may be configured to read-out, store and/or manipulate the one or more data signal(s) received from the/each sensor(s). In some examples, the control arrangement may be provided on or part of the structure. In other examples, the control arrangement may be provided separate from the structure.

In some examples, the control arrangement may comprise a power supply. The power supply may be configured to provide power to the first, second, third and/or fourth inductive elements and/or the sensor(s) or sensing element(s).

In some example, the control arrangement may comprise a processor or microprocessor and/or data storage or memory. The processor or microprocessor and/or data storage or memory may be configured to read-out, store and/or manipulate the one or more data signal(s) received from the/each sensor(s).

The structure may be or comprise a subsea structure, such as a buoy, e.g. a submerged turret loading or a submerged turret production buoy. In other examples, the structure may comprise an offshore structure, floating platform, vessel, chain table of a vessel or the like.

Any features defined in relation to the first aspect may be applied to the second aspect.

According to a third aspect there is provided a system for inductive transmission, the system comprising;

a plurality of connectors;

a structure comprising a plurality of second inductive elements; wherein the plurality of connectors is movably, e.g. rotatably or pivotably, connected or connectable to the structure, each connector of the plurality of connectors comprising a first inductive element, the first inductive element being arranged for inductive transmission with a second inductive element of the plurality of second inductive transmission elements of the structure.

Any features defined in relation to the first and/or second aspect may be applied to the third aspect.

According to a fourth aspect there is provided a structure, such as a marine structure, subsea structure, an offshore structure, floating platform, vessel, chain table of a vessel or the like, the structure comprising:

at least one second member for movable, e.g. rotatable or pivotal, connection of a connector, such as a subsea or underwater connector, to the structure;

a second inductive element provided on the second member, the second inductive element being arranged for inductive transmission with a first inductive element of the connector.

By providing inductive transmission between a connector, such as a subsea or underwater connector, and the structure, the need of wiring between the connector and the structure may be eliminated.

The at least one second member may comprise at least one second connection arrangement. The at least one second connection arrangement may be provided on the structure. For example, the structure may comprise one or more support member(s). The support members may extend or protrude from the structure. At least one pair of support members may be utilised for connecting the first member and/or connector to the structure. The support members may be arranged to be opposite or opposed and/or adjacent or proximate each other. The structure may be retrofitted with the support members.

Each support member may comprise a retaining member, such as a bracket or plate, such as a cheek plate.

The retaining member may comprise a recess or slot for receiving a first connection arrangement of the connector. For example, the elongate member or protrusion of the first connection arrangement may engage with slot or recess to connect, secure or attach the first member and/or connector to the structure, e.g. in use. The slot or recess may be configured for allowing rotational movement of the connector relative to the structure.

The structure may comprise a control arrangement. The control arrangement may comprise any features of the control arrangement defined in the second aspect. The control arrangement may be in communication with the first and/or second inductive element. The control arrangement may transmit the one or more signal(s) to the first and/or second inductive element. The control arrangement may be configured to receive the one or more signal(s) from the first and/or second inductive element.

The control arrangement may be coupled or linked to the second inductive element for transmission of the one or more signal(s) to the second inductive element. In some examples, the control arrangement may be coupled or linked to the second inductive element by a yet further coupling means or arrangement, such as wiring, electric connections, electric circuits or the like. The yet further coupling means or arrangement may be provided internal of the structure. For examples, the structure may comprise one or more further channel(s) or recess(es). The channel(s) or recess(es) may be adapted for receiving and/or enclosing the yet further coupling means or arrangement. By providing or enclosing the further coupling means or arrangement internally of the structure, damage of the wiring may be minimised or prevented.

Additionally or alternatively, the yet further coupling means may be provided external of the structure.

Additionally or alternatively, the control arrangement may be wirelessly coupled or linked to the second inductive element.

In some examples, the structure may be or comprise a subsea structure, such as a buoy, e.g. a submerged turret loading or a submerged turret production buoy. In other examples, the structure may be or comprise a marine structure, vessel, offshore structure, floating platform or the like.

Any features defined in relation to the first, second and/or third aspect may be applied to the fourth aspect.

According to a fifth aspect there is provided a method for inductive transmission between a connector, such as a subsea or underwater connector, and a structure, the method comprising:

providing a connector according to the first aspect, connector assembly according to the second aspect and/or system according to the third aspect of the present invention; and inductively transmitting one or more signal(s) between the connector and the structure.

The method may comprise transmitting one or more signal(s) between the/at least one of first inductive element and the respective second inductive element, third inductive element and fourth inductive element, the/at least one of the first inductive element and fourth inductive element, and/or second and fourth inductive elements.

The method may comprise inductively transmitting on or more signals between a plurality of inductive elements.

For example, the method may comprise inductively transmitting one or more signal(s) between first and second inductive elements.

The method may comprise connecting, such as movably, e.g. rotatably or pivotably, connecting a first member of the connector to the structure.

The method may comprise transmitting one or more signal(s) to the one or more sensor(s) or sensing elements, e.g. via the first, second, third and/or fourth inductive elements. The one or more signal(s) may provide power or energy to the sensor, which may be required to operate the sensor.

The method may comprise receiving one or more data signal(s) from the one or more sensor(s) or sensing elements.

The method may comprise operating the one or more sensor(s) or sensing element(s) to transmit data. Upon receiving of one or more power signal(s) the sensor may be actuated to transmit one or more data signal(s) to the control arrangement.

Any features defined in relation to the first, second, third and/or fourth aspect may be applied to the fifth aspect.

According to a sixth aspect there is provided an elongate member or protrusion for use in a connector, connector assembly and/or system according to the first, second and/or third aspect of the present invention, respectively.

The elongate member or protrusion may comprise a first inductive element, the first inductive element being arranged for inductive transmission with a second inductive element of a structure.

The first and/or second inductive elements may be arranged to transmit and/or receive one or more signal(s). The one or more signal(s) may comprise at least one or more of power, energy and/or data.

The elongate member or protrusion may comprise at least one sensor or sensing element. The first inductive element may be provided on the elongate member or protrusion so as to be coupled or linked to the sensor by a coupling means or arrangement, such as wiring, electric connection, electric cables, electric circuits or the like. The one or more power signal(s) transmitted from the second inductive elements to the first inductive element on the elongate member or protrusion may be utilised to provide power or energy to the sensor. Power or energy transmitted to the first inductive element may be required to operate the sensor.

Any features defined in relation to the first, second, third, fourth and/or fifth aspect may be applied to the sixth aspect.

According to a seventh aspect there is provided a further elongate member and/or a yet further elongate member for use in a connector, connector assembly and/or system according to the first, second and/or third aspect of the present invention.

The further elongate member and/or yet further elongate member may comprise a third inductive element, the third inductive element being arranged for inductive transmission with a fourth inductive element of a connector.

In use, the further elongate member may be utilised for connecting at least one other second member of the connector to a first member.

In use, the yet further elongate member may be utilised for connecting a further portion of the connector to the first and/or at least one other second member of the connector.

The further elongate member and/or yet further elongate member may comprise at least one sensor or sensing element. The sensor may be adapted/configured for monitoring, measuring and/or determining strain, load and/or tension, which may act on the further elongate member and/or yet further elongate member, e.g. in use.

The third inductive element may be coupled or linked to the sensor by a/at least one other coupling means or arrangement, such as wiring or one or more electric connections, one or more electric circuits or the like. The third inductive element may be arranged on a free end of the further elongate member and/or yet further elongate member.

When the further portion is connected to the first member and/or at least one other second member by the yet further elongate member, the third and fourth inductive elements may be in communication with one another, e.g. in use. When the further portion is connected to the first member and/or at least one other second member by the yet further elongate member, the third and fourth inductive element may be arranged so as to oppose and/or be adjacent or proximate one another, e.g. in use. When the further portion is connected to the first member and/or at least one other second member by the yet further elongate member, one or more signal(s) may be transmitted and/or received between the third and fourth inductive elements.

Any features defined in relation to the first, second, third, fourth, fifth and/or sixth aspect may be applied to the seventh aspect.

According to an eighth aspect there is provided a first member for use in a connector, connector assembly and/or system according to a first, second and/or third aspect of the present invention.

Any features defined in relation to the first, second, third, fourth, fifth, sixth, and/or seventh aspect may be applied to the eighth aspect.

According to a ninth aspect there is provided a connection, such as a subsea or underwater connection, the connection comprising:

a first member and a second member movably, e.g. pivotably or rotatably, connected or connectable to each other, the first and second members comprising respective first and second inductive transmission elements arranged for inductive transmission between the first and second inductive elements.

Inductive transmission may take place or occur over the connection while the connection may allow, movement, e.g. rotational movement, of the first and second members relative to each other.

Any features defined in relation to the first, second, third, fourth, fifth, sixth, seventh and/or eighth aspect may be applied to the ninth aspect.

It should be understood that the features defined above in accordance with any aspect of the present invention or below in relation to any specific embodiment of the invention may be utilised, either alone or in combination with any other defined feature, in any other aspect or embodiment of the invention.

BRIEF DESCRIPTION OF THE DRAWINGS

These and other aspects of the present invention will now be described, by way of example only, with reference to the accompanying drawings, in which:

FIG. 10a is a schematic representation of a system for inductive transmission according to another embodiment of the present invention;

FIG. 10b is an exploded view of the system of FIG. 10a; and

DETAILED DESCRIPTION OF THE DRAWINGS

Figure 1A:
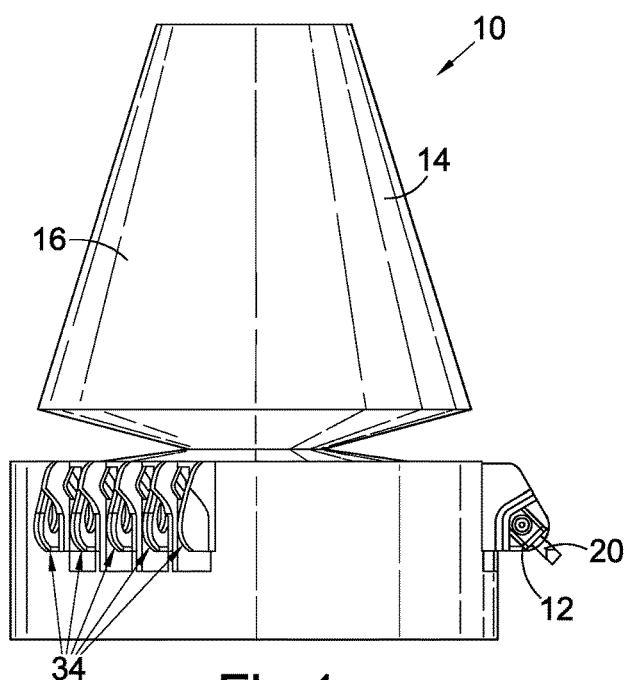
FIG. 1a is an isometric representation of a system for inductive transmission in accordance with an embodiment of the present invention.
Figure 1B:
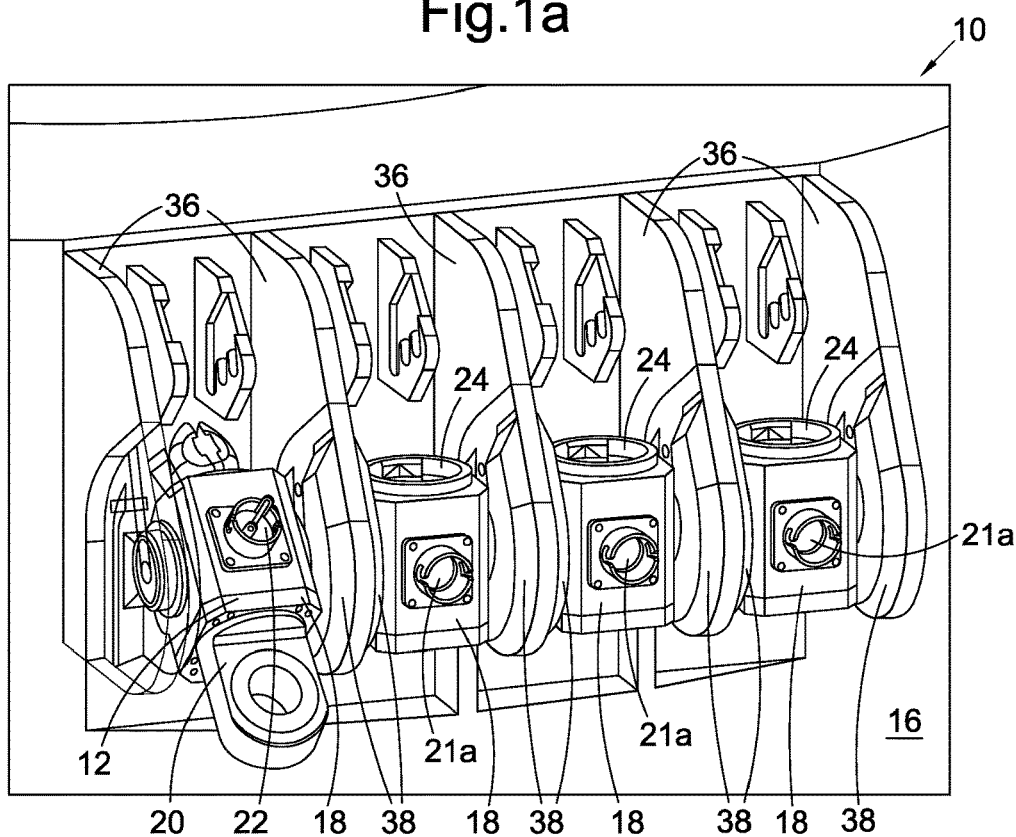
FIG. 1b is an isometric representation of a connector according to an embodiment of the present invention attached to a structure, such as a buoy.

Referring first to FIGS. 1a and 1b, in which there is shown a system for inductive transmission, generally identified by reference numeral 10, in accordance with an embodiment of the present invention. The system 10 includes a connector 12, such as a subsea or underwater connector, e.g. BTC connector. In FIGS. 1a and 1b, the connector 12 is shown as connected to a structure 14, here in the form of a buoy 16. The buoy 16 may be a submerged turret loading or a submerged turret production buoy, for example. It will be appreciated that submerged can include both fully submerged (e.g. entirely beneath a waterline) as well as partially submerged (e.g. partially beneath a waterline). In other examples, the structure may comprise an offshore structure, floating platform, vessel, chain table of a vessel or the like.

The connector 10 includes a first member 18, which is rotatably connected to the buoy 16 (four connectors 10 shown in the exemplary embodiment). As can be seen in FIGS. 1 and 1b, the first member 18 rotatably connects the connector 12 to the buoy 16.

Figure 2:
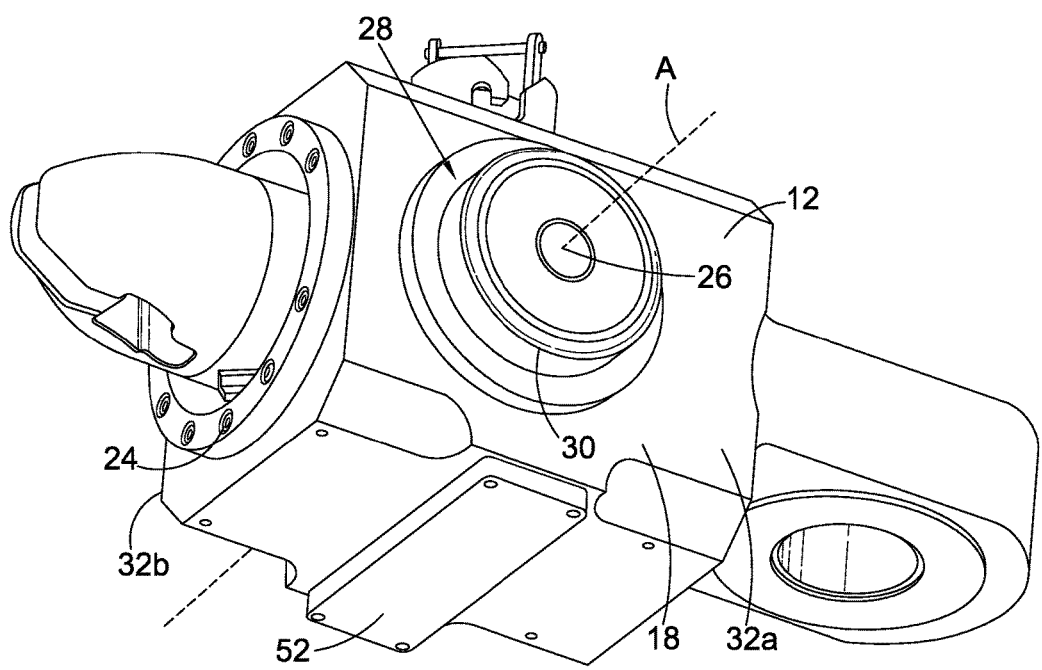
FIG. 2 is an isometric representation of the connector of FIG. 1b, showing a first inductive element provided on the connector.

Referring to the example of FIGS. 1a, 1b and 2, the first member 18 of the connector 12 is shown in the form of a female portion 18. The connector 12 includes a second member, which in can be in the form of a male portion 20, for example. Here, the female portion 18 includes a bore 24 for receiving the male portion 20.

FIGS. 1a and 1b show the male portion 20 as being connected to the female portion 18 by a pin 22, such as a shear or load pin. In use, the pin 22 can be utilised for connecting the female and male portions 18,20 to one another. Here, the female and male portions 18,20 are adapted for receiving the pin 22. For example, the female and/or male portion 18, 20 comprise respective first and/or second apertures 21a, 21b (only the first aperture 21a of the first portion is shown in FIG. 1b) configured for receiving the pin 22. It will be appreciated that in further examples, the female and male portions 18, 20 may be connected by a bolt or the like. The male portion 20 is connectable or connected to a line or chain, such as a mooring, anchoring or tethering line or chain or the like (not shown).

As can be seen in FIG. 2, the female portion 18 includes a first inductive element 26, which is arranged on the female portion 18 for inductive transmission with a second conductive element (not shown) of the buoy 16, as will be described below.

The connector 12 includes a first connection arrangement 28 for connection of the female portion 18 to the buoy 16. The first connection arrangement 28 defines a first axis A, which extends in a transverse direction of the female portion 18, as shown in FIG. 2.

In use, the first connection arrangement 28 allows rotation of the female portion 18 and/or connector 12 about or around the first axis A relative to the buoy 16. In use, the first axis A defines a first axis of rotation of the connector 12 and/or female portion 18. The first inductive element 26 can be provided on the first connection arrangement 28. For example, the first inductive element can be arranged or provided on or relative to the first axis A. As shown in FIG. 2, the first inductive element 26 is arranged to extend in a direction perpendicular or orthogonal to the first axis A and/or intersect the first axis A. The first and/or second inductive elements are arranged to extend in a direction along or parallel, e.g. substantially parallel, to a longitudinal axis of the female portion 218 and/or connector 12.

The first connection arrangement 28 can include or define a first bearing means or arrangement, which may be arranged to provide rotational movement, e.g. low friction rotational movement, of the female portion 18 and/or connector 12 relative to the buoy 16.

In this example, first connection arrangement 28 includes a first protrusion 30a and a second protrusion 30b (not shown in FIG. 2).

Figure 3:
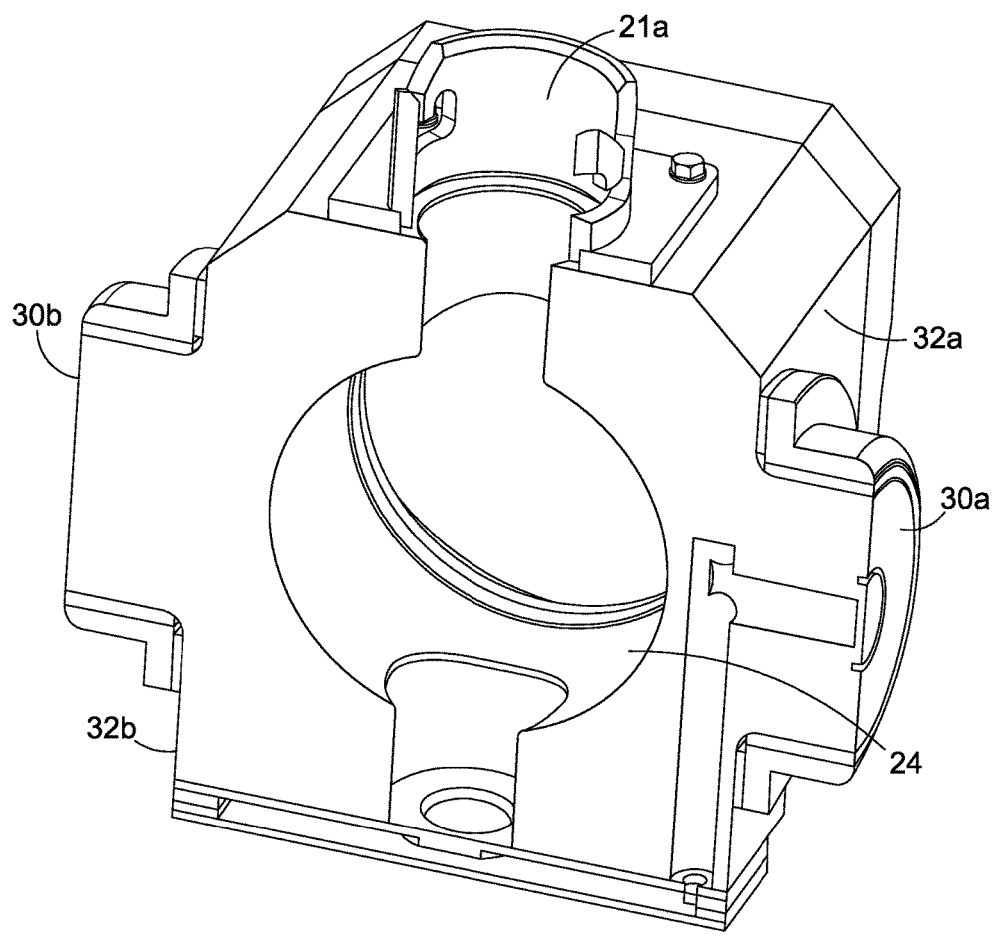
FIG. 3 is a cross-sectional representation of a female portion of the connector of FIG. 1b, showing the first and a fourth inductive element provided on the female portion.

Referring to the examples shown in FIGS. 2 and 3, the first and second protrusions 30a, 30b are provided on outer opposing surface(s) 32a, 32b of the female portion 18. Here, the first and second protrusions 30a, 30b are arranged coaxially to one another. The axis A extends through the first and second protrusions 30a, 30b. For example, the first axis A may be arranged to be coaxial with a central axis or longitudinal axis of the first and second protrusions 30a, 30b. Here, the first inductive element 28 is arranged, e.g. concentrically arranged, on an end of the protrusion 30a, as shown in FIG. 2. The first inductive element 26 may be coaxially arranged on or with the first axis A. In other words, a central or longitudinal axis of the first inductive element 26 may be coaxial with the first and/or second protrusions 30a, 30b and/or the first axis A. It will be appreciated that in further examples, the first inductive element may be provided on the second protrusion 30b or each protrusion of the first and second protrusions 30a,30b may comprise the first inductive element 26.

Referring to the examples shown in FIGS. 1a, 1b, 4a, 4b and 5, the system 10 includes another second member, which in this example may be provided as or include a second connection arrangement 34 for rotatably connecting the female portion 18 to the buoy 16, thereby connecting the connector 12 to the buoy 16. As can be seen in FIGS. 1a, 1b, 4a and 4b, the second connection arrangement 34 can be part of the buoy 16. The second connection arrangement may engage and/or secure the first connection arrangement 28, e.g. the first and second protrusions 30a, 30b of the female portion 18, to the buoy 16.

In some examples, the second connection arrangement 34, e.g. the further second member, and/or the buoy 16 includes a plurality of support members 36. A pair of support members 36 of the plurality of support members may be utilised to connect the female portion 18 and thereby the connector 12 to the buoy 16, as shown in FIG. 1b. In the example of FIG. 1b, the plurality of support members 36 extends or protrudes from the buoy 16. It will be appreciated that in some examples, the plurality of support members 36 are part of the buoy 16, while in other examples, the buoy or other subsea or offshore structures 16 may be retrofitted with the support member 36. Each support member 36 of the plurality of support members 36 includes a retaining member 38, such as a bracket or plate 38, such as a cheek plate or the like.

Figure 4A:
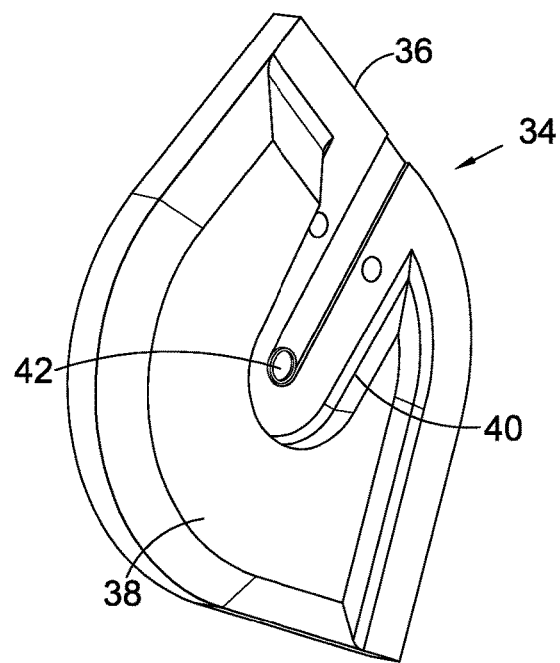
FIG. 4a is an isometric representation of a support member of a structure including a second inductive element.
Figure 4B:
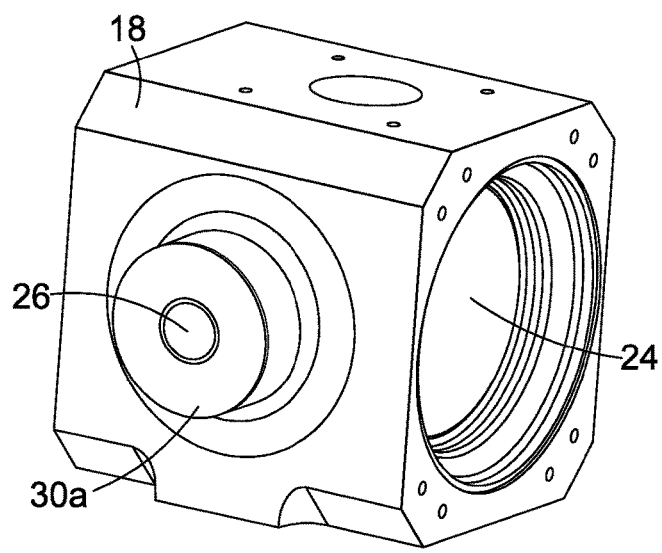
FIG. 4b is an isometric representation of the female portion of FIG. 3.

An example of the retaining member 38 is shown in FIG. 4a. As can be seen in FIG. 4a, retaining member 38 includes or defines a recess or slot 40 for receiving one of the protrusions 30a,30b of the female portion 18. The slot or recess 40 is configured to allow rotational movement of the female portion 18 relative to the support member 36, and/or the buoy 16. The/each protrusions 30a,30b engage with the respective slot or recess 40 of the second connection arrangement 34 of the buoy 16 to connect, secure or attach the female portion 18 and/or the connector 12 to the second connection arrangement 34 of the buoy 16. In other words, each protrusion 30a, 30b, engages with a respective slot or recess 40 of each retaining member 38.

As can be seen in FIG. 4a, the support member 36 includes a second conductive element 42. Here, a/the second inductive element 42 is provided on each support member 36 of the plurality of support members 36.

In use, when the female portion 18 and/or connector 12 is connected to the buoy, the first and second inductive elements 26,42 are arranged adjacent and facing each other so as to be in communication with each other. The first and/or second inductive elements 26, 42 are arranged to inductively transmit and/or receive one or more signal(s). The one or more signal(s) includes at least one or more of power, energy and/or data. Here, energy may include electric energy. The one or more signal(s) can comprise one or more power signal(s). Alternatively or additionally, the one or more signal(s) can comprise at least one or more data signal(s).

The first and/or second inductive element 26,42 can be configured for inductive transmission and/or reception of energy or power. Energy or power can be transmitted to and/or received by the first and/or second inductive elements 26,42 via the one or more power signal(s).

As described above, in some examples, the first and/or second inductive element 26,42 can be configured for inductive transmission and/or reception of data. Data can be transmitted to and/or received by the first and/or second inductive element 26,42 via the one or more data signal(s).

Figure 5:
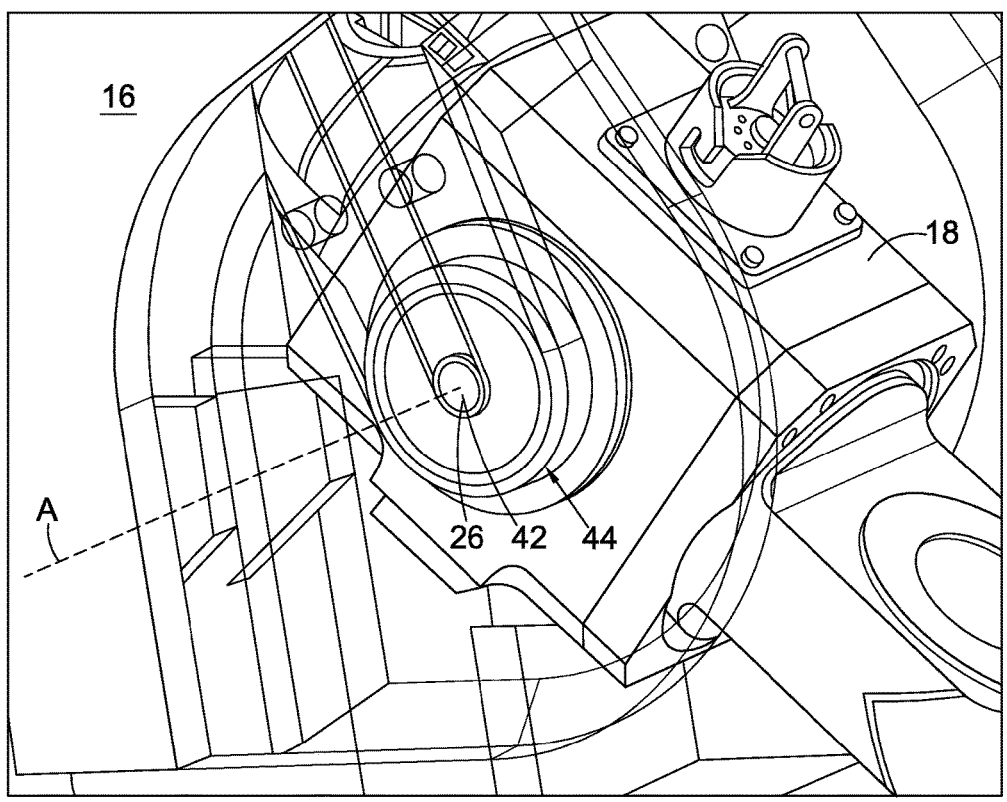
FIG. 5 is detailed view of the connector connected to the structure with the support member of FIG. 4a of the structure shown transparent.

As can be seen in FIG. 5, the first and/or second inductive element 26,42 are arranged relative to the first axis to maintain inductive transmission throughout rotational movement of the female portion 18 and/or connector 12 relative to the buoy 16 and/or around or about the first axis A. In use, the first and/or second inductive element can be arranged relative to the first axis A so as to extend in a direction perpendicular or orthogonal, e.g. substantially perpendicular or orthogonal, to the first axis A and/or to intersect the first axis A. In the example of FIG. 5, the first and second inductive elements 26,42 are arranged so as to oppose or be opposite each other, when the female portion 18 and/or connector 12 is connected to buoy 16. By arranging the first and second inductive elements 26,42 to oppose each other, inductive transmission and/or reception of the one or more signal(s) may be facilitated. It will be appreciated that in this example, the first and second inductive elements 26, 42 are arranged on or provided relative to the first axis A to permit and/or provide transmission and/or reception of the one or more signal(s) in a direction parallel to or along the first axis A and/or perpendicular, e.g. substantially perpendicular, to a/the longitudinal or central axis of the female portion 18 and/or connector 12, as for example shown in FIG. 5.

In some examples, the first and second inductive elements 26, 42 define a pair of inductive elements, e.g. a first pair of inductive elements 26, 42. Here, the first pair of inductive elements 26, 42 is associated with the first axis A. For example, transmission and/or reception of the one or more signal(s) between the first pair of induction elements 26, 42 may take place in a direction parallel to or along the first axis and/or perpendicular, e.g. substantially perpendicular, to a/the longitudinal or central axis of the female portion 18 and/or connector 12.

Referring to FIG. 5, when the female portion 18 and/or connector 12 is connected to the buoy 16, the first and second connection arrangements 28, 34 define a joint, linkage or connection 44, such as a first subsea or underwater joint, linkage or connection. Inductive transmission can take place or occur over the joint, connection or linkage 44 of the female portion 18 and/or connector 12 to buoy 16. The one or more signal(s) is transmitted and/or received across the joint 44 via the first and second inductive elements 26,42. By providing inductive transmission and/or reception of the one or more signal(s) across the joint, wiring, such as hard wiring may be eliminated while the joint 44 may maintain rotational movement of the female portion 18 and/or the connector 12 relative to the buoy 16.

By providing inductive transmission between the female portion 18 and/or connector 12 and the buoy 16, the need of wiring, such as hard wiring, between the female portion 18 and/or connector 12 and the buoy 16 may be eliminated.

Figure 6A:
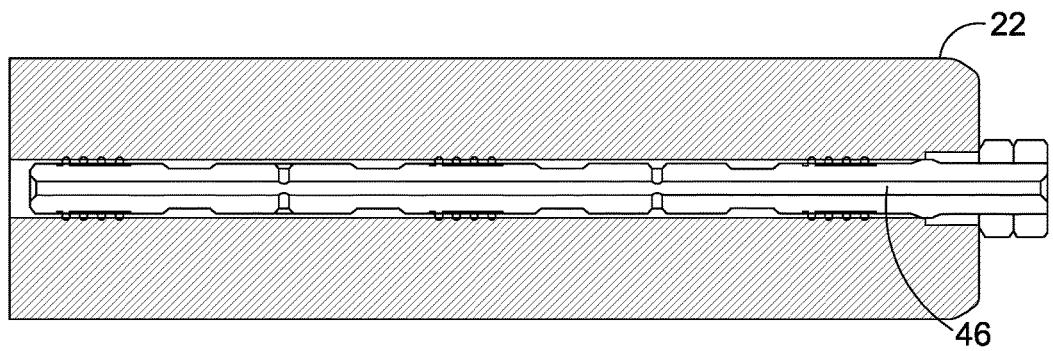
FIG. 6a is a cross-sectional representation of a pin for use in the connector of FIG. 1b.
Figure 6B:
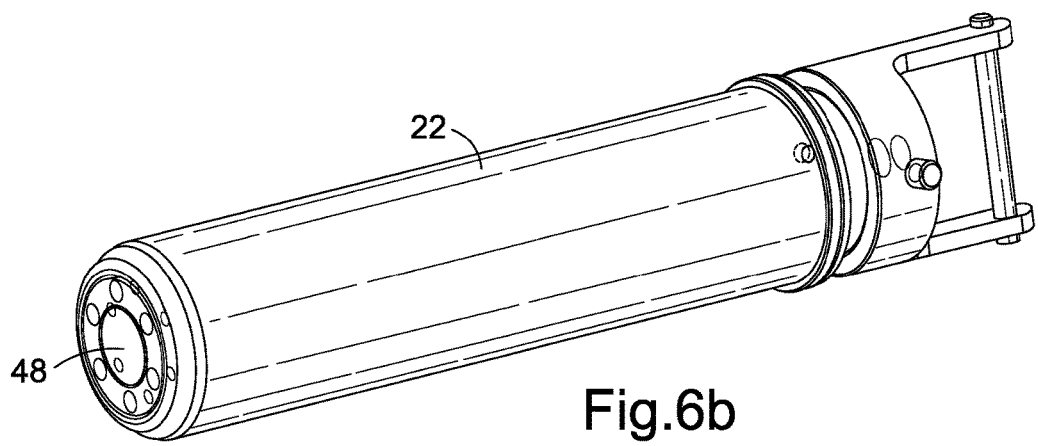
FIG. 6b is an isometric representation of the pin of FIG. 6a including a third inductive element.
Figure 6C:
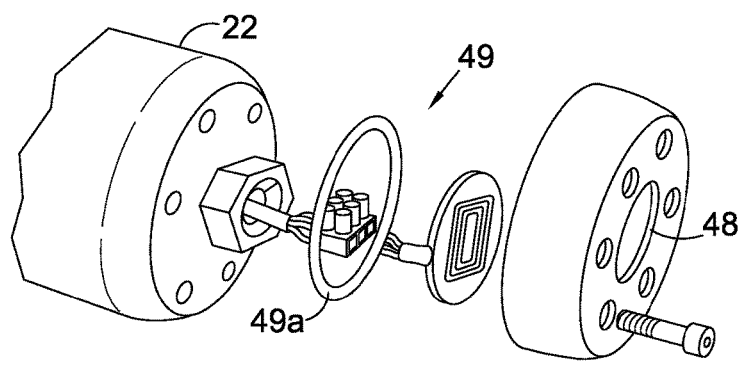
FIG. 6c is an exploded schematic representation of an end of the pin of FIG. 6b.

Referring to FIGS. 6a to 6c, the system 10 comprises a sensor 46, which can be part of the connector 12. In this example, the sensor 46 is a strain, load and/or tension sensor or gauge configured for monitoring, measuring and/or determining strain, load and/or tension, which may act on the connector 12, in use. It will be appreciated that in other examples, the sensor may include a load cell or sensor and/or a pressure sensor or the like, e.g. in addition to or instead of the strain, load and/or tension sensor or gauge.

Here, the sensor 46 is part of or comprised in the pin 22. The sensor 46 is adapted for monitoring, measuring and/or determining strain, load and/or tension, which may act on the pin 22, in use.

In some examples, the system 10 comprises a third inductive element 48. The third inductive element 48 can be part of or provided on the pin 22. The third inductive element 48 can be coupled or linked to the sensor 46 by a coupling means or arrangement 49, such as wiring or one or more electric connections, one or more electric circuits or the like. Here, the coupling means 49 include a sealing means 49a for providing a fluid tight coupling or connection between the third inductive element 48 and the sensor 46. In this example, the third inductive element 48 is shown as being arranged on a free end of the pin 22, as shown in FIG. 6b. It will be appreciated that in other examples, the third inductive 48 element may be provided on another portion of the pin 22.

Figure 7:
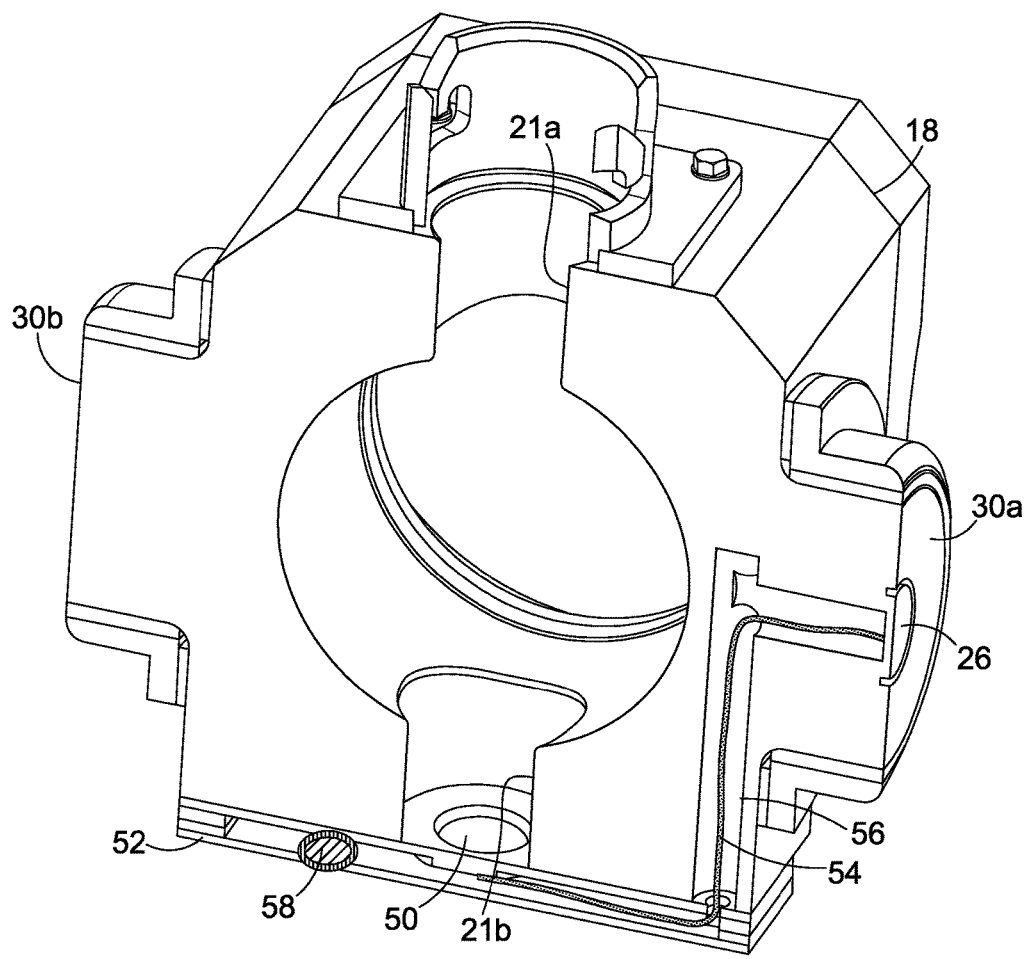
FIG. 7 is a view similar to FIG. 3 with the female portion having a coupling means provided between the first and fourth inductive elements.

Referring to FIG. 7, the system 10 comprises a fourth inductive element 50. In this example, the fourth inductive element 50 is part of or comprised in the female portion 18. The fourth inductive element 50 is provided or arranged on the female portion 18 to be communicable with the third inductive element 48, in use, e.g. when the male and female portion 18, 20 are connected together by the pin 22. In this example, the fourth inductive element 50 is provided in a housing 52, which can be attached to the female portion 18 so that the fourth inductive element 48 is communicable with the third inductive element 48, in use. For example, when the pin 22 is received in the female and/or male portion 18,20, the third and fourth inductive elements 48,50 are in communication with one another, e.g. in use. In the example of FIG. 7, the housing 52 is arranged to occlude one of the apertures 21a, 21b. Here, the fourth inductive element 50 is arranged in the housing 52 and/or on the female portion 18 to extend in a direction perpendicular to another transverse axis of the female portion 18 and/or a direction along or parallel, e.g. substantially parallel, to the longitudinal axis of the female portion 18 and/or connector 12.

Figure 8A:
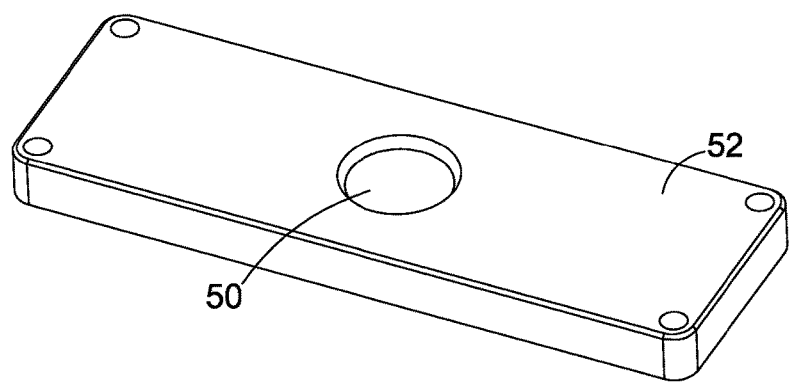
FIG. 8a is an isometric representation of a housing including the fourth inductive element.
Figure 8B:
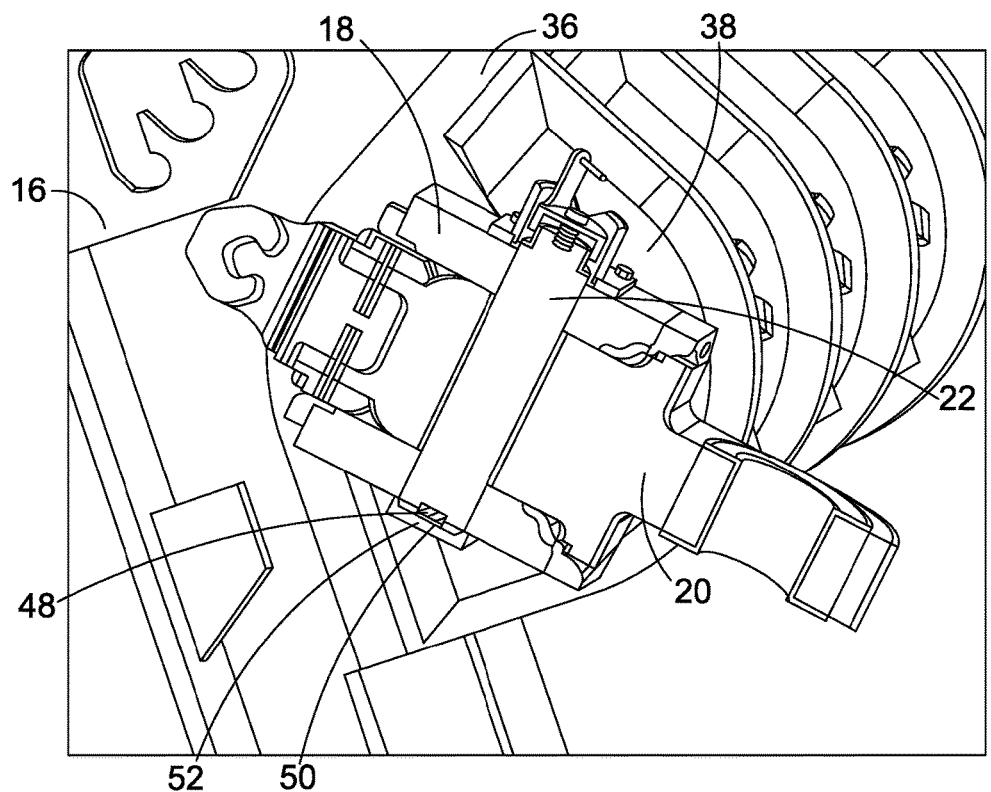
FIG. 8b is a cross-sectional representation of the connector connected to the structure.

Referring to FIGS. 8a and 8b, when the pin 22 is inserted in the female and/or male portion 18,20, e.g. in use, the third and fourth inductive elements 48,40 are arranged so as to be adjacent and oppose one another, e.g. to allow the one or more signal(s) to be transferred and/or received between the third and fourth inductive elements.

For example, in use, the one or more power signal(s) can be transmitted from the fourth inductive element 50 to the third inductive element 48 on the pin 22 to provide power or energy to the sensor 46. Power or energy transmitted to the third inductive element 48 may be required to operate the sensor 46.

Alternatively or additionally, the one or more data signal(s) received by the fourth inductive element 50 from the third inductive element 48 on the pin 22 can be utilised to receive or read-out data from the sensor 46. In some examples, the one or more power signal(s) can operate the sensor 46 to transmit or transfer one or more data signal(s) between the third and fourth inductive element 48,50.

The transmission of the one or more signal(s) between the third and fourth inductive elements 48,50 is inductive transmission. By providing inductive transmission of the one or more signal(s), removal of the pin 22 from the connector 12 may be facilitated. Inductive transmission of the one or more signal(s) between the third and fourth inductive element 48,50 may eliminate wiring of the sensor 46 to an external power supply to provide power to the sensor 46 and/or the use of a battery to enable data read-out.

Referring back to FIG. 7, the fourth inductive element 50 is in communication with the first and/or second inductive element 26,42. Here, the one or more signal(s) can be transferred between the first and fourth inductive elements 26,50. The first and fourth inductive elements 26,50 are coupled or linked to one another by a further coupling means or arrangement 54, such as wiring, one or more electric connections, one or more electric cables or electric circuits or the like, for transmission of the one or more signal(s) between the first and fourth inductive elements 26,50.

It will be appreciated that in further examples, the one or more signal(s) may be transferred wirelessly and/or inductively between the first and fourth inductive elements 26,50.

As can be seen in FIG. 7, the further coupling means or arrangement 54 is provided in the interior of the female portion 18. Here, the female portion 18 and/or housing 52 comprises a recess or channel 56 adapted for receiving and/or enclosing the coupling means or arrangement 54. By providing the coupling means or arrangement internally of the female portion 18, damage of the further coupling means 54 may be minimised or prevented.

In some examples, the system 10 can comprise a further sensor 58. The further sensor 58 may be part of or comprised in the connector 12, such as in the female portion 18. It will be appreciated that in other examples, the further sensor 58 may be comprised in the male portion 20 and/or the pin 22. Here, the further sensor 58 can be arranged/configured to monitor and/or measure an inclination and/or rotational movement of the female portion 18 with respect to the buoy 16. For example, the further sensor 58 may be utilised to indicate and/or determine an attitude or pitch, e.g. attitude or pitch angle, of the female portion 18 and/or connector 12 relative to the buoy. In some examples, the further sensor 58 may comprise a gyroscope, e.g. a MEMS (microelectromechanical systems) gyroscope. It will be appreciated that in other examples, one or more rotary and/or tilt sensor(s) and/or sensor assemblies may be utilised instead of or in addition to the further sensor 58 or sensor 56.

In the above examples, the system has been described as including four inductive elements. It will be appreciated that in other examples, the system 10 may comprise less than four or more than four inductive elements. For example, the system 10 can comprise a plurality of inductive elements. The first, second, third, and/or fourth inductive element 26,42,48,50 may be comprised or part of in the plurality of inductive elements. At least two of the plurality of inductive elements may define a pair of inductive elements and/or may be in communication with each other, e.g. transmit and/or received the one or more signal(s). The/each pair of the inductive elements may be associated with an axis, such as a rotational axis of the connector 12. The/each pair of inductive elements may be arranged to extend perpendicular, e.g. substantially perpendicular, to and/or to intersect the axis associated with the respective pair of inductive elements. Each pair of inductive elements may be arranged to extend in a direction along or parallel, e.g. substantially parallel, to a longitudinal axis of the connector 12. Transmission and/or reception of the one or more signal(s) between the pair of inductive elements may take place or occur in a direction along or parallel to the axis associated with the respective pair of inductive elements and/or perpendicular, e.g. substantially perpendicular, to a/the longitudinal or central axis of the connector 12.

Although the above system has been described with respect to connection between a subsea or underwater connector 12 to a buoy 16, it will be appreciated that in other examples, the inductive elements or pairs of inductive elements may be provided on a chain stopper or an underwater mooring connector or the like, e.g. on or relative to one or more axis (axes) or rotational axis (axes) of the chain stopper or underwater mooring connector.

Referring to FIGS. 10*a* and 10*b*, there is shown an alternative example of a system 210 for inductive transmission according to an embodiment of the present invention. The system 210 in FIGS. 10*a* and 10*b* is similar to that shown in FIGS. 1*a* and 1*b*, and as such like/similar features share like reference numerals, incremented by 200. In this example, the connector 212 is in the form of a chain stopper 212 for connecting a chain or line to a structure, which may be in the form of chain table 216, for example a chain table of a buoy or vessel. It will be appreciated that in other examples, the chain stopper 212 may be connected directly to a vessel or buoy or to a platform, such as a floating platform, an offshore structure or the like.

Here, the connector 212 includes a first member, which in this example is in the form of a first portion 218, which is rotatably or pivotably connected to the chain table 216.

As can be seen in FIGS. 10*a* and 10*b* the connector 212 comprises a second member 60, rotatably or pivotably connected to the first portion 218. A further portion 220, which in this example is in the form of a chain engaging means, such as latch or ratchet or the like, is rotatably or pivotably connected by a pin 222 to the second member 60. Here, the pin 222 can be a load or shear pin, e.g. a load bearing pin. The chain engaging means 220 and second member 60 are adapted for receiving the pin 220 in respective first and second apertures 221*a*,221*b* of the chain engaging means 220 and the second member 60 (only the first aperture 221*a* is shown in FIGS. 10*a* and 10*b*).

In this example, the first portion 218 comprises a plurality of first connection arrangements 244*a*, 244*b*, which each include a first inductive element of a plurality of first inductive elements 224*a*,224*b*. Two first inductive elements 224,224*b* are shown in FIGS. 10*a* and 10*b*. It will be appreciated that in other examples more than two or less than two first inductive elements may be provided on the first portion 218 and/or the/each first connection arrangement 244*a*, 244*b*.

Here, at least one of the first connection arrangements 244*a*,244*b* includes one or more members, which in this example are in the form of a first pin or bolt 62 and/or a second pin or bolt 64 (only the second pin 64 is shown in FIG. 10b).

In the example of FIGS. 10a and 10b, the first pin 62 connects the first portion 218 to the chain table 216, for example using a second connection arrangement 234a. Here, the first portion 218 comprises or defines a first axis A, which can be a first axis of rotation of the first portion 218. For example, in use, the first portion 218 and/or the connector 212 may be rotatable or pivotable relative to the chain table 216, e.g. about or around the first axis A. The first axis A extends in a transverse direction of the first portion 218 and/or is substantially perpendicular or orthogonal to a longitudinal axis of the first portion 218. Here, the first axis A can be coaxial with a longitudinal or central axis of the first pin 62, e.g. when the first portion 218 is connected to the chain table 216 by the first pin 62. In other words, the first pin 62 may define or provide the first axis of the first portion 218, in use.

In the example of FIGS. 10a and 10b, the second pin 64 connects together the first portion and the second member 60. Here, the second member 60 comprises or defines a second axis B, which is a second axis of rotation of the second member 60. For example, the second axis B may permit movement, e.g. rotational movement of the second member 60 relative to the first portion 218. The second axis B extends in a transverse direction of the first portion 218 and/or second member 60 and/or is substantially perpendicular or orthogonal to a longitudinal axis of the first portion 218 and/or second member 60. The second axis B can be substantially perpendicular or orthogonal to the first axis A. Here, the second axis B is coaxial with a longitudinal or central axis of the second pin 64. In other words, when the second member 60 is connected to the first portion 218, in use, the second pin 64 may define or provide the second axis B of the chain stopper 212. It will be appreciated that the pin 222 defines a third axis of the connector, which may be in this example an axis of rotation of the chain engaging means 220 relative to the second member 60. The third axis may extend in a transverse direction of the second member 60 and/or connector 212. The third axis may be substantially perpendicular or orthogonal to a longitudinal axis of the second member 60 and/or connector 212. The third axis may be coaxial with a central or longitudinal axis of the pin 222.

Here, the chain table 216 and/or the second member 60 each include a second connection arrangement 234a,234b. Each second connection arrangement includes a respective second inductive element 242a,242b.

In this example, at least one of the first connection arrangements 244a,244b includes a plurality of housing or casings 65a, 65b, in which the first inductive elements 224a, 224b can be arranged or provided, as shown in the example of FIGS. 10a and 10b. The housings 65a,65b are connected or connectable to the first portion 218. The housings 65a,65b locate and/or position the first inductive elements 224a,224b relative to the second inductive elements 242a, 242b. The housings 65a,65b provide fluid tight housings of the first inductive elements 224a,224b. It will be appreciated that each first conductive element 224a, 224b forms or defines one or more pairs of inductive elements with a respective second conductive element 242a, 242b. Each pair of inductive elements 224a, 224b, 242a, 242b can be associated with an axis of the chain stopper 212. For example, the first and second inductive elements 224a, 242a form a first pair of inductive elements that is associated with the first axis A of the chain stopper 212 and/or the first and second inductive elements 224b, 242b form a second pair of inductive elements associated with the second axis B of the chain stopper 212, as shown in the example of FIGS. 10a, 10b and 11 b.

As can be seen in FIGS. 10a and 10b, the first and/or second inductive elements 224a,224b,242a,242b, e.g. first and second pairs, are arranged or provided relative to the first and/or second axis A, B. The first and/or second inductive elements 224a,224b,242a,242b are arranged relative to the first and/or second axis A,B to maintain inductive transmission between the first and second elements 224a, 224b,242a,242b throughout rotation of the first portion 218 relative to the chain table 216 and/or rotation of the second member 60 relative to the first portion 218. By providing inductive transmission between the first portion 218 and the second member 60, the need for wiring, such as hard wiring, between the first portion 218 and the second 60 member may be eliminated.

In some examples, the first and/or second inductive element 224a, 224b, 242a, 242b, e.g. the first and/or second pairs of inductive elements, are arranged or provided so as to extend in a direction perpendicular or orthogonal, e.g. substantially perpendicular or orthogonal, to the respective first and/or second axis A,B and/or to intersect the respective first and/or second axis A,B, as shown in the examples of FIGS. 10a, 10b and 11 b. As can be seen in the examples of FIGS. 10a and 10b, the first and/or second inductive elements 224a, 224b, 242a, 242b, e.g. the first and/or second pairs of inductive elements, are arranged or provided to extend in a direction along or parallel to a longitudinal axis of the chain stopper 212. For example, in use, each of the first and second inductive elements 224a, 224b, 242a, 242b are arranged to oppose each other, which may permit transmission and/or reception of the one or more signal(s) between the first and second inductive elements 224a, 224b, 242a, 242b. It will be appreciated that in some examples, a third pair of inductive elements may be associated with the third axis, for example, as described above in relation to the first and/or second axis.

In some examples, the at least one of second connection arrangements 234a, 234b includes a plurality of support members 236, which may be in the form of brackets or plates, for example. In this example, the plurality of support members 236 are arranged on the chain table 216 so as to extend or protrude from the chain table 216. The support members 236 can be configured to locate and/or position the second inductive element 242a, e.g. on the chain table 216, relative to the respective first inductive element 224a. The support members 236 may be provided in pairs of support member 236. Each support member 236 of the/each pair of support member 236 may include an aperture 237. The first portion 218 includes a first aperture and/or a second aperture (not shown). In use, the first pin 62 extends through the apertures 237 of a pair of support members 236 and/or the first and second apertures of the first portion 218, thereby connecting the first portion 218 to the chain table 216.

At least one support member of each/the pair of support member 236 may be provided with a respective second inductive element 242a, which may be arranged on the first pin 62 and/or to occlude at least one of the apertures 237 of each/the pair of support members 236, as shown in the example of FIG. 10b. Here, transmission between the first inductive element 224a and the second inductive element 242a, e.g. the first pair of inductive elements, defines an external connector transmission path. In other words, transmission takes place between a first inductive element 224a provided on the first portion 218 and a respective second inductive element provided on at least one support member 236 of the chain table 216.

In some examples, the second member 60 can include at least one other second connection arrangement 234b, which may be in the form of an attachment member 66. The attachment member 66 can be part of the second member 60. It will be appreciated that in other examples the attachment member may be part of the first portion 218 in addition to or instead of the second member 60. The attachment member 66 is configured to connect or couple the first portion 218 to the second member 60. For example, the attachment 66 member, e.g. the second member 60, may include two opposing further apertures (not shown). The first portion 218 may comprise another aperture (not shown). The first portion 218 and the second member 60 can be connected to each other by the second pin or bolt 64, which in use extends through the other aperture of the first portion and the further apertures of the second member 60, e.g. the attachment member 66.

In some examples, the other second connection arrangement 234b includes a further housing 70, casing or enclosure. Here, the further housing 70 is connected to the second member 60. The further housing 60 includes the second inductive element 242b. As can be seen in FIG. 10a, the further housing 70 locates and/or positions the second inductive element 242b relative to the respective first inductive element 224b. In this example, inductive transmission between the first and second inductive elements 224b,242b, e.g. the second pair of inductive elements, defines an internal connector transmission path. The further housing 70 may provide a fluid tight housing of the second inductive element 242b.

As described above, pin 222 can include a sensor 246 for monitoring, sensing and/or measuring strain, load and/or tension acting on the chain stopper 212, e.g. in use. It will be appreciated that in other examples, a/the sensor 246 may be included in both or either of the first or second pin 62,64 in addition to or instead of the sensor 246 of the pin.

In some examples, the chain stopper 212 can include a third inductive element 248, which in this example is provided on the pin 222.

The chain stopper 212 includes a fourth inductive element 250. Here, the fourth inductive element 250 is provided or arranged on the second member 60 to be communicable with the third inductive element 248 provided on the pin 222, e.g. in use.

The fourth inductive element 250 can be provided in a yet further housing 72, casing or enclosure, which can be attached to or provided on the second member 60, such as on an outer surface 74 of the second member 60.

As described above, the third and/or fourth inductive elements 248,250 are configured for inductive transmission and/or reception of the one or more signal(s).

For example, when the pin 222 is received in the first and/or second apertures 221a,221b of the second member 60 and the chain engaging means, the third and fourth inductive elements 248,250 are in communication with one another, e.g. in use. When the pin 222 is inserted in the second member 60 and/or chain engaging means 220, the third and fourth inductive element 248,250 are arranged so as to oppose each other. By providing inductive transmission of the one or more signal(s), removal of the pin 222 from the chain stopper 212 may be facilitated. Inductive transmission of the one or more signal(s) between the third and fourth inductive element 248,250 may eliminate wiring of the sensor 246 to provide power to the sensor and/or the use of a battery or the like to enable data read-out.

The fourth inductive element 250 may be in communication with the first and second inductive elements 224a, 224b, 242a, 242b. Here, one of the second inductive elements 242b and the fourth inductive element 250 are coupled or linked to one another by a further first coupling means or arrangement 76, which may be in the form of wiring, one or more electric connections, one or more electric cables or electric circuits or the like, for example, for transmission of the one or more signal(s) between the second and fourth inductive elements. Each of the first inductive elements 224a, 224b of the plurality of inductive elements can be connected by a further second coupling means 78, which may be in the form of wiring, one or more electric connections, one or more electric cables or electric circuits or the like, for example. As can be seen in FIG. 10a, the further second coupling means 78 between each of the first inductive elements 224a, 224b and/or between the further first coupling means 76 between one of the second 242b inductive elements and the fourth inductive element 250 is provided between the housings 65a, 65b and/or between the further housing 70 and the yet further housing 72, respectively, which are secured to the chain stopper 212 and static, i.e. non-moving, in use.

By arranging the further first and second coupling means between the non-moving housings 65a,65b and/or the between the non-moving further housing 70 and the yet further housing 72, damage of the coupling means due to rotational movement of the chain stopper 212, in use, may be prevented.

Figure 11A:
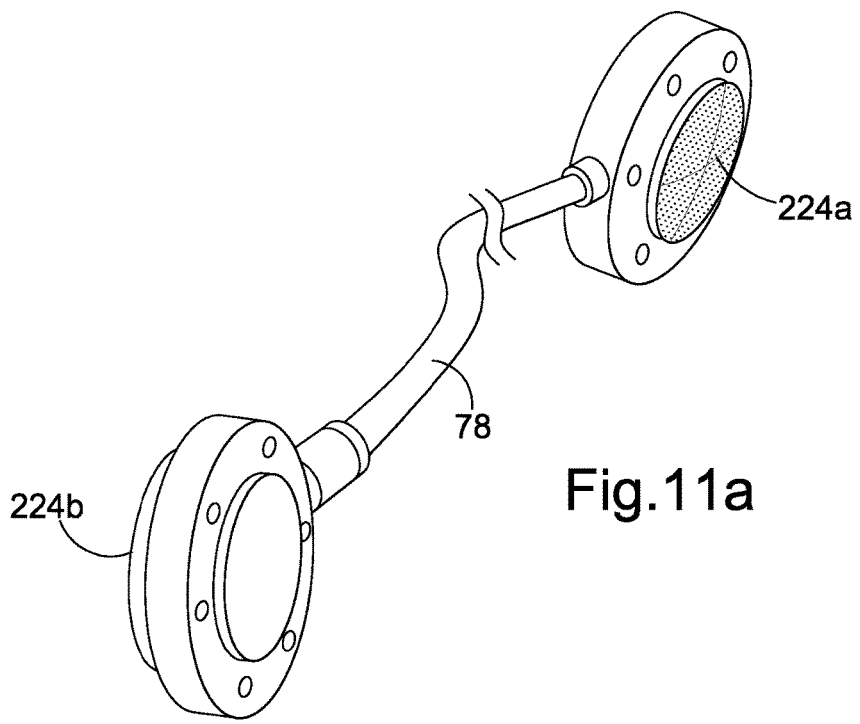
FIGS. 11a and 11b are schematic representations of an arrangement of first and second inductive elements of the system of FIG. 10a relative to each other.

Referring to FIG. 11a there is shown an exemplary arrangement of the first inductive elements 224a,224b coupled together by the further second coupling means 78. In this example, the first inductive element are arranged and/or sealed in housings 65a, 65b, which can be fluid tight.

Figure 11B:
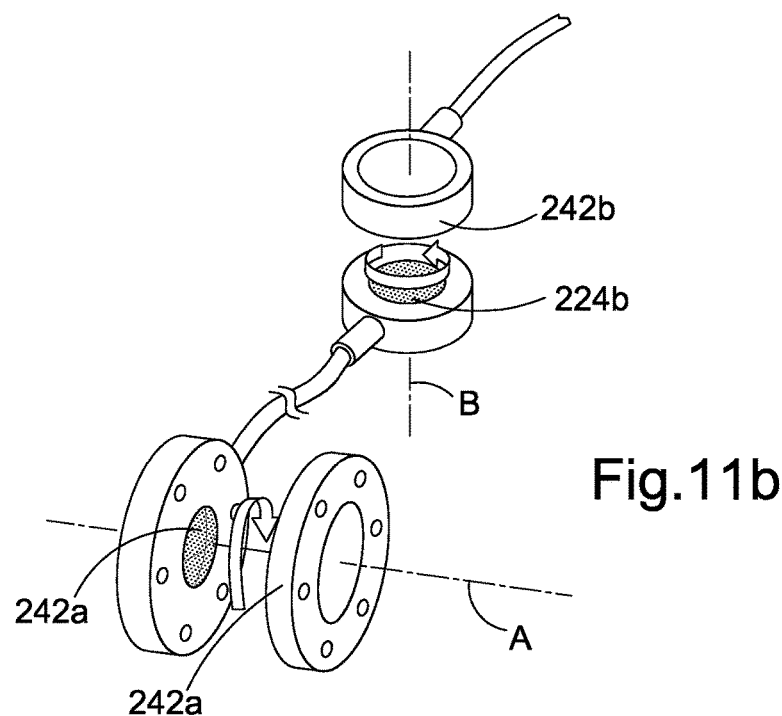

Referring to FIG. 11b there is shown an exemplary arrangement of the first and second inductive elements 224a, 224b, 242a, 242b, e.g. the first and second pairs of inductive elements, relative to the respective first and second axes A,B, which are axes of rotation in this example. As described above, the first and second inductive element 224a, 224b, 242a, 242b are arranged opposite each other for inductive transmission. It will be appreciated that in other examples, the first and second elements may be provided on further axes of rotation of a connector or chain stopper than those described above.

In some examples, the connector 12 and/or chain stopper 212 may be utilised to moor, tether, and/or anchor a structure to a seabed. In other examples, the connector 12 or chain stopper 212 may be utilised to connect a chain, line, wire, rope or the like to a structure, such as a buoy 16, e.g. a submerged turret loading or a submerged turret production buoy, or a chain table 216 of a buoy or vessel. In other examples, the structure may comprise an offshore structure, floating platform, vessel, chain table of a vessel or the like.

Figure 9:
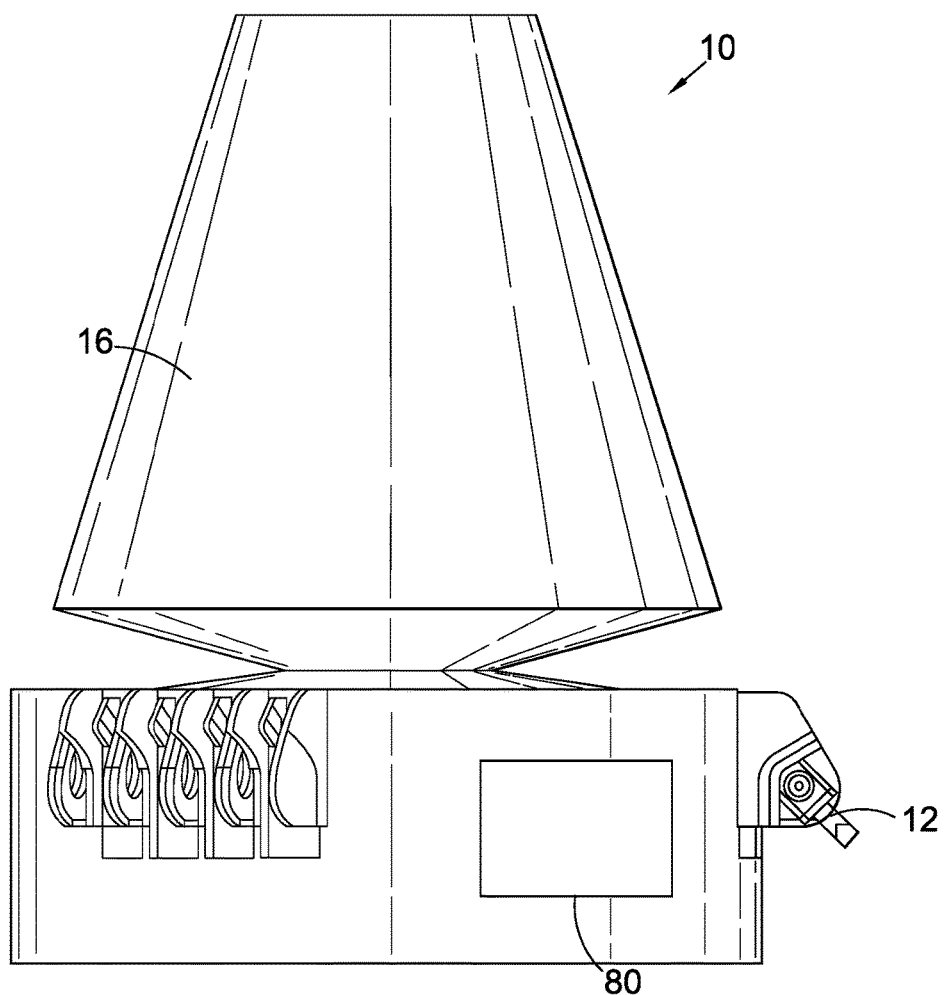
FIG. 9 is a schematic view of the structure with a control arrangement provided thereon.

Referring to FIG. 9, the system 10, 210 can include a control arrangement 80. Although FIG. 9 shows the control arrangement as being implemented in the system 10 having a buoy 16, it will be appreciated that in other examples, the control arrangement may also be implemented on the chain table 216 of system 210 and/or other subsea, offshore or marine structures or the like. The control arrangement 80 can be in communication with the sensor 46, 58, 246, for example via the plurality of inductive element, e.g. the first, second, third and/or fourth inductive elements 26,42,48,50, 226,242,248,250. In some examples, the control arrangement 80 provides the one or more signal(s) to the sensor 46,246, e.g. via the first, second, third and/or fourth inductive element 26,42,48,50,226,242,248,250. The control arrangement 80 can be configured to receive the one or more signal(s) from the sensor 46,246, e.g. via the first, second, third and/or fourth inductive element 26,42,48,50,226,242, 248,250.

In some examples, the control arrangement 80 includes a power supply, which may be configured to provide power to the first, second, third and/or fourth inductive elements 26,42,48,50,226,242,248,250 and/or the sensor 46, 58, 246.

The control arrangement can include a processor or microprocessor and/or data storage or memory, which may be configured to read-out, store and/or manipulate the one or more data signal(s) received from the/each sensor 46, 58, 246. The control arrangement 80 can be configured to read-out, store and/or manipulate the one or more data signal(s) received from the sensor 46, 58, 246. In some examples, the control arrangement 80 is provided on or part of the buoy 16 or chain table 216, as shown in FIG. 9. It will be appreciated that in other examples, the control arrangement 80 may be provided separate from the buoy 16 or chain table 216.

In some examples, the control arrangement 80 is coupled or linked to the second inductive element 42, 242 for transmission of the one or more signal(s) between the second inductive element 42, 242 and the control arrangement 80. The control arrangement 80 may be coupled or linked to the second inductive element 42,242 by a yet further coupling 82 means or arrangement, which may be in the form of wiring, electric connections, electric circuits or the like, for example. The coupling means or arrangement 80 can be provided internal of the buoy 16 or chain table 216. For examples, the buoy 16 or chain table 216 may comprise one or more further channel(s) or recess(es) (not shown). The channel(s) or recess(es) are adapted for receiving and/or enclosing the yet further coupling means or arrangement 82. By providing or enclosing the further coupling means or arrangement internally of the buoy, damage of the wiring may be minimised or prevented.

It should be understood that the embodiments described herein are merely exemplary and that various modifications may be made thereto without departing from the scope of the invention.

For example, there may be provided more than two first inductive and/or second inductive elements 224a, 224b, 242a, 242b. At least one/each first inductive element may be associated with a respective second inductive element to define a pair of inductive elements. The connector may comprise a plurality of axes, such as rotational axes. Each pair of inductive elements may be associated with at least one axis of the plurality of axes. For example, transmission and/or reception of the one or more signal(s) between the first and second inductive elements of the pair of inductive elements may take place in a direction along or parallel to the at least one axis and/or perpendicular, e.g. substantially perpendicular, to a longitudinal axis of the connector.

In some examples, the sensor 46, 246 may be or include a load cell or sensor and/or a pressure sensor or the like.

For examples, the sensor 58 may be utilised to indicate and/or determine an attitude or pitch, e.g. attitude or pitch angle, of the first portion 218 and/or chain stopper 212 relative to the chain table 216. In some examples, the sensor 58 may comprise a gyroscope, e.g. a MEMS (microelectromechanical systems) gyroscope.

It will be appreciated that in further examples, one or more rotary and/or tilt sensor(s) and/or sensor assemblies may be utilised instead or addition to the sensor 58.

In further examples, a position sensor, e.g. linear position sensor or linear inductive position sensor, proximity sensor, e.g. an ultrasonic or inductive proximity sensor, accelerometer or the like, may be provided instead or in addition to the sensor 58.

Alternatively or additionally, the sensor 58 may be configured to measure and/or determine one or more properties, e.g. salinity, acidity and/or alkalinity, of a connector environment, such as a subsea or underwater environment. The sensor 58 may comprise an arrangement or means for optical observation, such as a camera or the like, and/or an arrangement or means for acoustical observation, such as a loudspeaker or the like, of a connector environment.

The invention claimed is:

1. A mooring connector, comprising:
a portion connected or connectable to a mooring chain or line;
a first member movably connected or connectable to a second member; and
a first inductive element provided on the first member, the first inductive element being arranged for inductive transmission and/or reception with a second inductive element of the second member,
wherein the first member is rotatably or pivotably connected or connectable to the second member, and the first inductive element is arranged on the first member to maintain inductive transmission with the second inductive element of the second member throughout movement of the first member relative to a second member.

2. A method for inductive transmission between a mooring connector and a marine structure, the method comprising:
providing the mooring connector according to claim 1; and inductively transmitting one or more signal(s) between the mooring connector and the marine structure.

3. The method according to claim 2, wherein the method comprises transmitting one or more signals to a sensor or sensing element and/or receiving one or more data signals from the sensor.

4. The connector according to claim 1, wherein the first member defines or comprises a first axis, which defines a first axis of rotation of the first member and/or connector relative to the second member and/or define a transverse axis of the first member.

5. The connector according to claim 4, wherein the first and/or second inductive element is arranged relative to the first axis to maintain inductive transmission between the first and second elements throughout rotational or pivotal movement of the first member relative to the second member about or around the first axis.

6. The connector according to claim 4, wherein the first axis is substantially perpendicular or orthogonal to a longitudinal axis of the first member and/or connector.

7. The connector according to claim 4, wherein the first and/or second inductive element is arranged to extend in a direction substantially perpendicular to the first axis and/or to intersect the first axis.

8. The connector according to claim 4, wherein the first and/or second inductive element is arranged to extend in a direction substantially parallel to a longitudinal axis of the first member.

9. The connector according to claim 1, wherein the first and/or second inductive elements are arranged to transmit and/or receive one or more signals, wherein the one or more signals comprise one or more power or energy signals and/or one or more data signals.

10. The connector according to claim 1, wherein the first member comprises a first connection arrangement, wherein the first inductive element is arranged or provided on the first connection arrangement so as to be communicable with the second inductive element, in use.

11. The connector according to claim 1, wherein there are provided a plurality of second members, each second member being provided with a respective second inductive element.

12. The connector according to claim 1, wherein the connector comprises a plurality of axes of rotation, wherein at least one first inductive element and/or second inductive element is provided on or relative to each axis of the plurality of axes and/or a second axis is orthogonal to a/the first axis.

13. The connector according to claim 1, wherein the connector comprises a sensor or sensing element.

14. The connector according to claim 1, wherein the connector comprises a third inductive element.

15. The connector according to claim 14, wherein the connector comprises a fourth inductive element, and the first or second inductive element and fourth inductive element are coupled or linked to each other by a further coupling arrangement for transmission of one or more signal(s) between the first or second inductive element and fourth inductive element.

16. The connector according to claim 1, wherein the connector is or comprises a chain stopper, an underwater or subsea connector or an underwater or subsea mooring connector.

17. A system for inductive transmission, the system comprising:
a plurality of mooring connectors according to claim 1;
a marine structure comprising a plurality of second inductive elements;
wherein the plurality of mooring connectors are movably connected or connectable to the marine structure, each mooring connector of the plurality of mooring connectors comprising a first inductive element, the first inductive element being arranged for inductive transmission with a second inductive element of the plurality of second inductive transmission elements of the marine structure.

18. A marine structure, subsea structure, offshore structure, floating platform, vessel, or chain table of a vessel, comprising:
a second member for rotatable or pivotal connection of the mooring connector according to claim 1 to the structure;
a second inductive element provided on the second member, the second inductive element being arranged for inductive transmission with a first inductive element of the mooring connector.

19. A mooring connector or connection assembly, the mooring connector or connection assembly comprising:
a portion connected or connectable to a mooring chain or line;
a first member movably connected or connectable to a second member;
a first inductive element provided on the first member, the first inductive element being arranged for inductive transmission and/or reception with a second inductive element of the second member,
wherein the first member is rotatably or pivotably connected or connectable to the second member, and the first inductive element is arranged on the first member to maintain inductive transmission with the second inductive element of the second member throughout movement of the first member relative to a second member; and
a structure,
wherein the mooring connector is movably connected or connectable to the structure.

20. A mooring connection comprising:
a portion connected or connectable to a mooring chain or line;
a first member and a second member movably connected or connectable to each other, the first and second members comprising respective first and second inductive transmission elements arranged for inductive transmission between the first and second inductive elements,
wherein the first member comprises a first axis, the first axis being substantially perpendicular to a longitudinal axis of the first member, and wherein the first inductive element is arranged relative to the first axis to maintain inductive transmission with the second element throughout movement of the first member relative to the second member.

21. A mooring connector comprising:
a portion connected or connectable to a mooring chain or line;
a first member movably connected or connectable to a second member; and
a first inductive element provided on the first member, the first inductive element being arranged for inductive transmission and/or reception with a second inductive element of the second member,
wherein the first member comprises a first axis, the first axis being substantially perpendicular to a longitudinal axis of the first member, and wherein the first inductive element is arranged relative to the first axis to maintain inductive transmission with the second element throughout movement of the first member relative to the second member.

22. A structure comprising:
a second member for movable connection of a first member of a mooring connector according to claim 21 to the structure; and
a second inductive element provided on the second member, the second inductive element being arranged for inductive transmission with a first inductive element of the connector, wherein the second inductive element is arranged relative to a first axis of the first member to maintain inductive transmission with the first element throughout movement of the first member relative to the second member, the first axis being substantially perpendicular to a longitudinal axis of the first member, when the connector is connected to the structure.

23. A system for inductive transmission, the system comprising:
a mooring connector according to claim 21; and
a structure, the structure comprising the second member for connecting the connector to the structure.

24. A method for inductive transmission between a connector and a structure, the method comprising:
providing a system according to claim 23; and
inductively transmitting one or more signals(s) between the connector and the structure.

* * * * *